US011667478B2

(12) United States Patent
Klueber et al.

(10) Patent No.: US 11,667,478 B2
(45) Date of Patent: *Jun. 6, 2023

(54) SYSTEM AND METHOD FOR CONTROLLING AN ACCUMULATION CONVEYOR

(71) Applicant: Intelligrated Headquarters, LLC, Mason, OH (US)

(72) Inventors: Kevin Klueber, Monroe, OH (US); Randolph T. Skanse, Mason, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 262 days.

This patent is subject to a terminal disclaimer.

(21) Appl. No.: 17/113,705

(22) Filed: Dec. 7, 2020

(65) Prior Publication Data
US 2021/0086998 A1    Mar. 25, 2021

Related U.S. Application Data

(63) Continuation of application No. 16/162,923, filed on Oct. 17, 2018, now Pat. No. 10,889,451.

(51) Int. Cl.
*B65G 47/26*    (2006.01)
*B65G 43/10*    (2006.01)
*G05B 19/418*    (2006.01)

(52) U.S. Cl.
CPC ........... *B65G 47/261* (2013.01); *B65G 43/10* (2013.01); *B65G 47/268* (2013.01); *G05B 19/4189* (2013.01); *B65G 47/263* (2013.01)

(58) Field of Classification Search
CPC .... B65G 47/261; B65G 43/10; B65G 47/268; B65G 47/263; G05B 19/4189
See application file for complete search history.

(56) References Cited

U.S. PATENT DOCUMENTS 3,724,642 A * 4/1973 De Good ............. B65G 47/261
                                                198/781.09
4,174,777 A * 11/1979 Riehle ................. B65G 47/261
                                                198/781.06

(Continued)

FOREIGN PATENT DOCUMENTS

EP      2421777 A2    2/2012
WO   2010/108097 A2   9/2010

OTHER PUBLICATIONS

Extended European Search Report for Application No. 19203118.5, dated Mar. 13, 2020, 6 pages.

(Continued)

*Primary Examiner* — Thomas Randazzo
(74) *Attorney, Agent, or Firm* — Alston & Bird LLP

(57) ABSTRACT

Various embodiments described herein relate to controlling a conveyor that comprises at least a first zone that is upstream of a second zone. A second control module associated with the second zone receives a first signal from a first control module associated with the first zone. The first signal indicates that one of a first article that has an irregular boundary or a second article that has a regular boundary exits from the first zone. The second control module controls the second drive assembly and a second brake assembly based on the indication by the first signal.

20 Claims, 22 Drawing Sheets

(56) References Cited

U.S. PATENT DOCUMENTS

| | | | | |
|---|---|---|---|---|
| 4,278,166 A * | 7/1981 | Pirro, Jr. | B65G 47/261 | 198/781.04 |
| 4,453,627 A | 6/1984 | Wilkins | | |
| 4,721,203 A * | 1/1988 | Kimball | B65G 47/261 | 198/781.01 |
| 4,854,445 A * | 8/1989 | Eaton | B65G 47/261 | 198/781.06 |
| 5,266,810 A | 11/1993 | Murphy | | |
| 5,375,689 A * | 12/1994 | Sapp | B65G 13/075 | 193/35 A |
| 5,810,158 A * | 9/1998 | Schiesser | B65G 47/268 | 198/460.1 |
| 6,047,812 A * | 4/2000 | Horn | B65G 43/10 | 198/460.3 |
| 6,253,906 B1 * | 7/2001 | Hall | B65G 43/10 | 198/460.1 |
| 6,315,104 B1 * | 11/2001 | Ebert | B65G 47/261 | 198/460.1 |
| 6,318,544 B1 * | 11/2001 | O'Connor | B65G 17/24 | 198/779 |
| 7,631,747 B2 | 12/2009 | Zeitler | | |
| 10,889,451 B2 * | 1/2021 | Klueber | B65G 47/268 | |
| 2003/0116408 A1 * | 6/2003 | Topmiller | B65G 47/261 | 198/781.05 |
| 2004/0112713 A1 * | 6/2004 | Haan | B65G 43/10 | 198/419.2 |
| 2005/0065641 A1 * | 3/2005 | Nagai | B65G 47/261 | 198/781.06 |
| 2005/0121296 A1 | 6/2005 | Haan et al. | | |
| 2006/0272929 A1 * | 12/2006 | Taylor | B65G 47/261 | 198/781.06 |
| 2007/0119690 A1 * | 5/2007 | Lupton | B65G 47/261 | 198/781.06 |
| 2007/0261941 A1 * | 11/2007 | Pelak | B65G 47/261 | 198/781.05 |
| 2010/0322473 A1 * | 12/2010 | Taylor | B65G 43/10 | 382/103 |
| 2011/0067977 A1 * | 3/2011 | Neiser | B65G 47/261 | 198/461.1 |
| 2013/0213768 A1 * | 8/2013 | Yokoya | B65G 43/08 | 198/462.1 |
| 2015/0068871 A1 * | 3/2015 | Tachibana | B65G 43/10 | 198/502.1 |

OTHER PUBLICATIONS

Non-Final Rejection dated May 12, 2020 for U.S. Appl. No. 16/162,923.

Notice of Allowance and Fees Due (PTOL-85) dated Oct. 29, 2020 for U.S. Appl. No. 16/162,923.

Notice of Allowance and Fees Due (PTOL-85) dated Sep. 10, 2020 for U.S. Appl. No. 16/162,923.

Intention to grant dated Dec. 7, 2022 for EP Application No. 19203118.

* cited by examiner

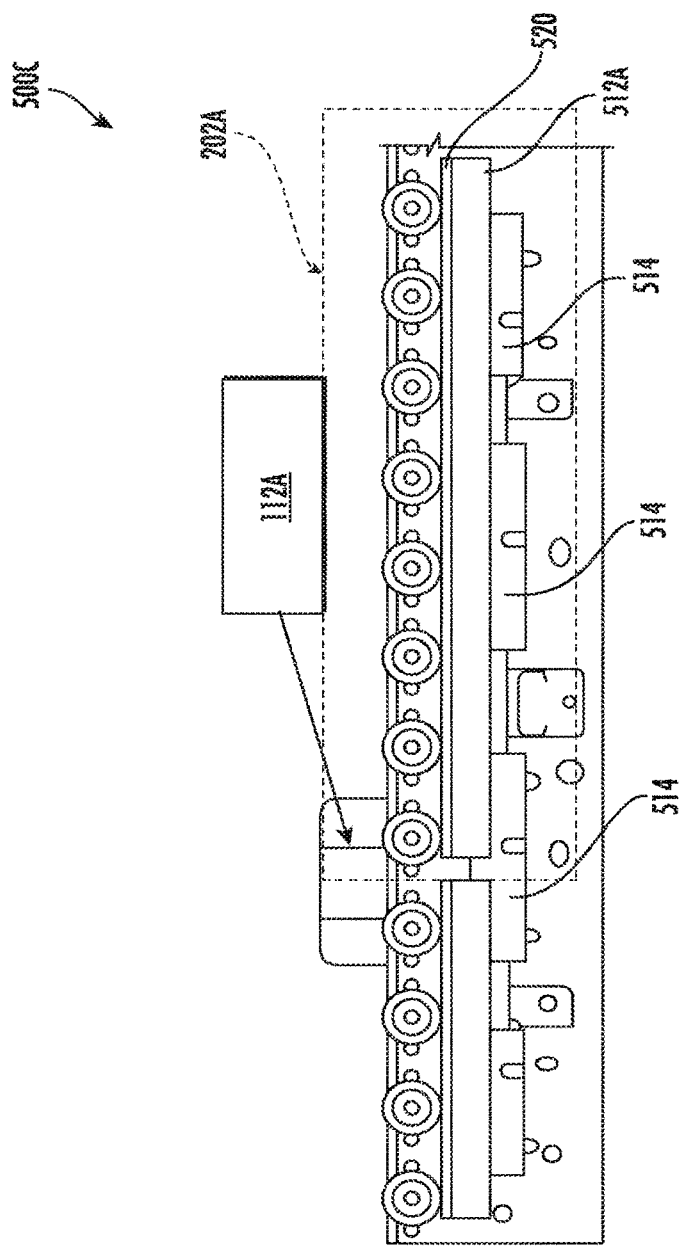

SYSTEM AND METHOD FOR CONTROLLING AN ACCUMULATION CONVEYOR

RELATED APPLICATIONS

This application is a continuation of, and claims priority to U.S. application Ser. No.: 16/162,923 filed on Oct. 17, 2018 entitled "SYSTEM AND METHOD FOR CONTROLLING AN ACCUMULATION CONVEYOR", the entirety of which is incorporated by reference herein.

TECHNOLOGICAL FIELD

Exemplary embodiments of the present disclosure relate generally to accumulation conveyors and, more particularly, to methods and systems for controlling an accumulation conveyor.

BACKGROUND

In typical accumulation conveyor systems, a variety of articles, such as cartons and polybags, often run on the same conveyor line downstream of a packing station, prior to a shipping sorter(s) in a facility, such as a warehouse. In such accumulation conveyor systems, the brake assembly in each zone is pneumatically joined with the drive assembly and is engaged automatically when the drive assembly drops away, through a shuttle valve. Given both the brake and the drive assemblies are controlled by the same shuttle valve, they are logically linked, thus, such accumulation conveyor systems exhibit accumulation that is either zero pressure or low pressure. Therefore, all articles being conveyed on such single line accumulation conveyors are accumulated in a similar fashion.

Applicant has identified a number of deficiencies and problems associated with conventional accumulation conveyors. Through applied effort, ingenuity, and innovation, many of these identified problems have been solved by developing solutions that are included in embodiments of the present disclosure, many examples of which are described in detail herein.

BRIEF SUMMARY

Various embodiments described herein relate to a method for controlling an accumulation conveyor. The accumulation conveyor may comprise a plurality of zones, the plurality of zones comprising at least a first zone, a second zone, and a third zone, wherein the first zone is upstream of the second zone and the second zone is upstream of a third zone. The method may comprise receiving, by a second control module associated with the second zone, a third feedback signal from a third control module associated with the third zone, wherein the third feedback signal indicates that a third sensor in the third zone is blocked. The method may further comprise setting, by the second control module, a second drive assembly associated with the second zone to a disengaged state. The method may further comprise receiving, by the second control module, a first signal from a first control module associated with the first zone, wherein the first signal indicates that one of a first article having an irregular boundary or a second article having a regular boundary exits from the first zone. The method may further comprise controlling, by the second control module, the second drive assembly and a second brake assembly associated with the second zone based on the indication of the exit of the one of the first article or the second article from the first zone by the first signal received from the first control module.

In an embodiment, the method may further comprise detecting, by a first sensor associated with the first zone, a boundary type of an article conveyed by the accumulation conveyor in the first zone, wherein the article corresponds to the one of the first article having the irregular boundary or the second article having the regular boundary, and determining, by the first control module associated with the first zone, whether the first sensor is blocked by the first article or the second article in the first zone. Based on the determination of whether the first zone is occupied by the first article or the second article, the first signal may be generated by the first control module. When the second drive assembly of the second zone is set to the disengaged state based on the third feedback signal received from the third control module associated with the third zone, the method may include transmitting, by the first control module, the first signal to the second control module associated with the second zone. In an embodiment, the method may include generating, by the third control module, the third feedback signal based on a signal received from the third sensor indicating that the third sensor is blocked in the third zone.

In an embodiment, the controlling of the second drive assembly and the second brake assembly further comprises maintaining the second drive assembly in the disengaged state in an instance in which the first signal indicates that the second article having the regular boundary exits from the first zone and the second article enters the second zone. The second article entering the second zone coasts to stop exhibiting zero pressure accumulation due to the disengaged state of the second drive assembly.

In an alternate embodiment, the controlling of the second drive assembly and the second brake assembly may further comprise setting the second drive assembly to an engaged state until a first sensor is blocked by the first article, and setting the second drive assembly to the disengaged state and the second brake assembly to an engaged state when the first article blocks a second sensor in an instance in which the first signal indicates that the first article having the irregular boundary exits from the first zone and the first article enters the second zone. The first article entering the second zone may stop exhibiting zero contact accumulation due to the disengaged state of the second drive assembly and the engaged state of the second brake assembly. In an instance in which the first article blocks the second sensor, a second feedback signal may be transmitted to the first control module by the second control module. The second feedback signal may indicate to the first control module to set a first brake assembly to an engaged state and a first drive assembly to a disengaged state when the first sensor is blocked by one of another first or second article.

Various embodiments described herein relate to a material handling system. The material handling system may comprise an accumulation conveyor that includes a plurality of zones comprising at least a first zone, a second zone, and a third zone, wherein the first zone is upstream of the second zone, wherein the second zone is upstream of the third zone. The accumulation conveyor may further include a plurality of sensors, comprising at least a first sensor, a second sensor, and a third sensor, wherein the first sensor is located at an exit portion of the first zone, the second sensor is located at an exit portion of the second zone, and the third sensor is located at an exit portion of the third zone. The accumulation conveyor may further include a plurality of control modules comprising at least a first control module, a second control module, and a third control module, wherein the first control module is communicably coupled with the first sensor, the first zone, and second control module, wherein the second control module is communicably coupled with the second sensor, the second zone, and third control module, wherein the third control module is communicably coupled with the third sensor and the third zone. The second control module is configured to receive a third feedback signal from the third control module, wherein the third feedback signal indicates that the third sensor in the third zone is blocked, set a second drive assembly associated with the second zone to a disengaged state, receive a first signal from the first control module associated with the first zone, wherein the first signal indicates that one of a first article having an irregular boundary or a second article having a regular boundary exits from the first zone, control the second drive assembly and a second brake assembly associated with the second zone based on the indication of the exit of the one of the first article or the second article from the first zone by the first signal received from the first control module, and a main controller communicably coupled with the accumulation conveyor to perform operations to receive data indicating conditions for each zone of the plurality of zones. In various embodiments, the conditions may comprise at least an operation of the accumulation conveyor in an upstream or downstream direction and a speed of each of the plurality of zones.

In an embodiment, the main controller may be further configured to control movement of a plurality of articles on the accumulation conveyor, and monitor fault conditions associated with one or more of the plurality of zones, the plurality of sensors, and the plurality of control modules.

The first sensor may be configured to detect a boundary type of an article conveyed by the accumulation conveyor in the first zone, wherein the article corresponds to the one of the first article having the irregular boundary or the second article having the regular boundary. The first control module may be further configured to determine whether the first sensor is blocked by the first article or the second article in the first zone, generate the first signal based on the determination of whether the first zone is occupied by the first article or the second article, and transmit the first signal to the second control module associated with the second zone when the second drive assembly of the second zone is set to the disengaged state based on the third feedback signal received from the third control module associated with the third zone. The third control module may be configured to generate the third feedback signal based on a signal received from the third sensor indicating that the third sensor is blocked in the third zone.

In an embodiment, the controlling of the second drive assembly and the second brake assembly may further comprise maintaining the second drive assembly in the disengaged state in an instance in which the first signal indicates that the second article having the regular boundary exits from the first zone and the second article enters the second zone, wherein the second article entering the second zone coasts to stop exhibiting zero pressure accumulation due to the disengaged state of the second drive assembly.

In an alternate embodiment, the controlling of the second drive assembly and the second brake assembly may further comprise setting the second drive assembly to an engaged state until the first sensor is blocked by the first article, and setting the second drive assembly to the disengaged state and the second brake assembly to an engaged state when the first article blocks the second sensor in an instance in which the first signal indicates that the first article having the irregular boundary exits from the first zone and the first article enters the second zone. The first article entering the second zone may stop exhibiting zero contact accumulation due to the disengaged state of the second drive assembly and the engaged state of the second brake assembly. In an embodiment, the second control module may be further configured to transmit a second feedback signal to the first control module in an instance in which the first article blocks the second sensor, wherein the second feedback signal indicates to the first control module to set a first brake assembly to an engaged state and a first drive assembly to a disengaged state when the first sensor is blocked by one of another first or second article.

The above summary is provided merely for purposes of providing an overview of one or more exemplary embodiments described herein to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained within the following detailed description and its accompanying drawings.

BRIEF DESCRIPTION OF THE DRAWINGS

The description of the illustrative embodiments may be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 5A-5C illustrate various views showing a section through the front view and side views of the various mechanical components of an accumulation conveyor 102, in accordance with an embodiment described herein;

DETAILED DESCRIPTION

Figure 1:
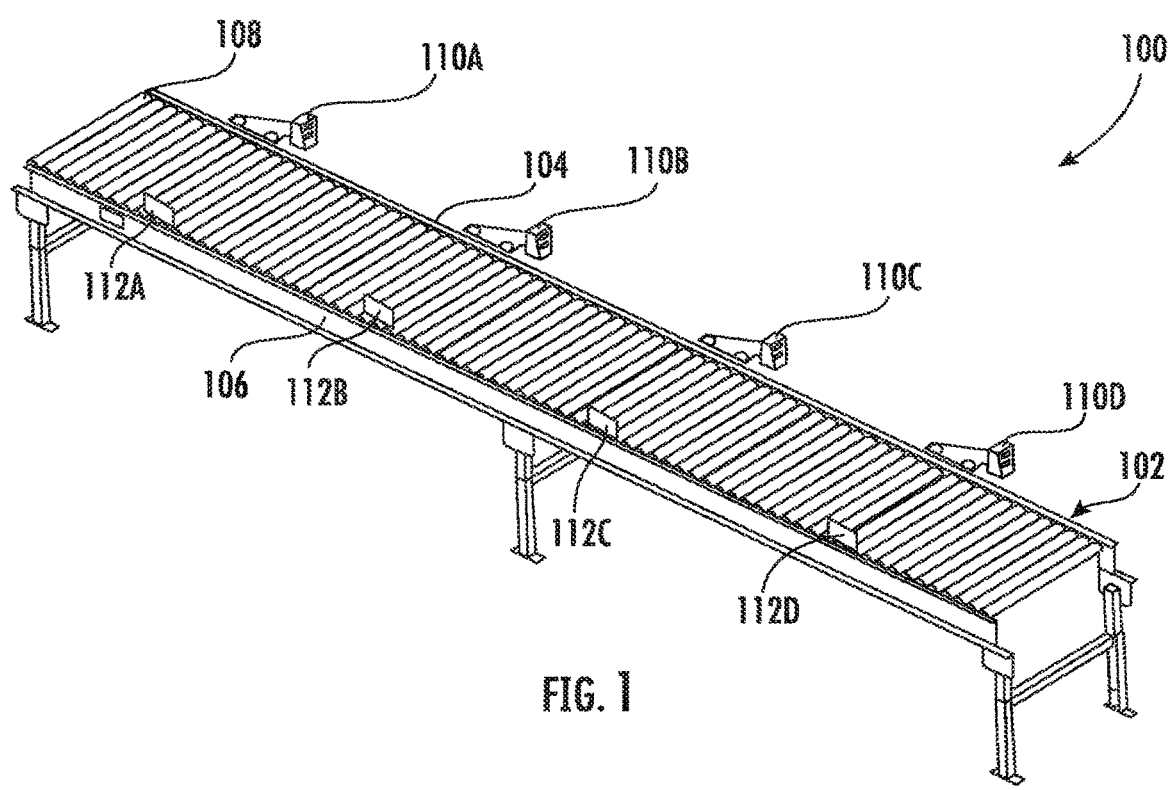
FIG. 1 is a perspective view 100 of a portion of an accumulation conveyor generally indicated by 102, in accordance with one or more embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such component or feature may be optionally included in some embodiments, or it may be excluded.

As stated above, in typical single line accumulation conveyor systems, a brake assembly in each zone is pneumatically joined with a drive assembly of the corresponding zone. Thus, in a traditional conveyor system, the brake is pneumatically joined to the drive and the brake automatically engages when the drive disengages. Because both the brake assembly and the drive assembly are linked, such single line accumulation conveyor systems exhibit accumulation of a single type (e.g., either zero pressure or zero contact) for each and every zone of the conveyor system. Therefore, all articles being conveyed on such single line accumulation conveyors are accumulated in one of either zero pressure accumulation or zero contact accumulation. For articles having irregular boundaries, indicia printed on and/or adhered to the article may become illegible due to undesired shingling (e.g., overlapping), contact, and/or distorting of the packaging under zero pressure accumulation. Thus, in such typical single line accumulation conveyors, if any of the articles to be accumulated on the system have irregular boundaries, then all of the articles accumulated on the system are accumulated with zero contact accumulation, greatly reducing the throughput of the conveyor.

Increasing the throughput and efficiency of article accumulation is critical to owning the warehouse of the future. Thus, to address the above problems related to minimized throughput and reduced efficiency, there is desired an adaptive system and method for accumulation of articles on a single conveyor, such that for packages with irregular boundaries, appropriate gaps are maintained between them, and for packages with regular boundaries, gaps are eliminated. This may result in maximized throughput, increased efficiency, and enhanced competitive advantage for customer return on investment (ROI), which are ultimately is critical to owning the warehouse of the future.

Specifically, in accordance with various embodiments disclosed herein, packages or articles having irregular boundaries, such as polybags, are properly orientated and positioned to maintain suitable gaps therebetween, thereby, resulting in zero-contact accumulation, so that barcodes and/or other indicia printed and/or adhered thereto become and/or remain legible and can be properly scanned, thereby increasing overall efficiency of the system. Further, packages or articles having regular boundaries, such as cartons, are properly orientated and positioned to eliminate gaps therebetween, thereby, resulting in zero pressure accumulation, so that overall throughput of the conveyor system can be maximized within the single conveyor. Thus, various embodiments of the present invention allow for intermixing zero pressure and zero contact accumulation of various objects on the same conveyor.

In other words, various embodiments of the present disclosure facilitate accumulation of articles with irregular boundaries in a "non-contact" fashion with sufficient gaps and thus, leaving gaps between two articles. Further, the accumulation of articles with regular boundaries is facilitated in a zero-pressure fashion eliminating undesired gaps between two articles. Thus, for example, a single conveyor allows for 'coast-to-stop' accumulation for cartons and 'non-contact' accumulation for polybags simultaneously within the same line. Because of separate valves used to control the drive assembly and the brake assembly, the brake assembly can be used as needed separate from the drive assembly. In this manner, each zone is enabled to adapt to on-the-fly engagement of the brake assembly based on the type of the article being conveyed on the single conveyor.

Having described an example embodiment at a high level, the design of the various devices performing various example operations is provided below.

FIG. 1 is a perspective view 100 of a portion of an accumulation conveyor generally indicated by 102, in accordance with one or more embodiments described herein. The accumulation conveyor 102 may include two spaced apart frame sides 104 and 106 which support a plurality of conveyor rollers 108 extending transversely between the frame sides 104 and 106. As is well known, the conveyor rollers 108 are supported at each end by a hex shaped axle, each of which engages a complementarily shaped opening formed in the frame sides 104 and 106. The conveyor rollers 108 are rotatably supported by the axle, with the shape of the openings in the frame sides 104 and 106 preventing rotation of the axle. The upper edge of the plurality of conveyor rollers 108 defines an upper conveying surface on which articles being conveyed are located.

The accumulation conveyor 102 may further include a plurality of sensors 110A, 110B, 110C, and 110D and respective reflectors 112A, 112B, 112C, and 112D. The plurality of sensors 110A, 110B, 110C, and 110D may be located at the frame side 104 and the reflectors 112A, 112B, 112C, and 112D may be located at the opposite frame side 106. In various embodiments described herein, each sensor 110A, 110B, 110C, and 110D may be a photo eye and a corresponding reflector is located across at opposite frame side from the sensor. For example, the sensor 110A is located at the frame side 104 and corresponding reflector 112A is located at the opposite frame side 106, the sensor 110B is located at the frame side 104 and corresponding reflector 112B is located at the opposite frame side 106, the sensor 110C is located at the frame side 104 and corresponding reflector 112C is located at the opposite frame side 106, and the sensor 110D is located at the frame side 104 and corresponding reflector 112D is located at the opposite frame side 106. In various embodiments, a photo eye is a photo electric sensor. For example, a photo eye may be configured to determine the distance, absence, or presence of an object or article using a light transmitter (e.g., an infrared or visible light transmitter) and a photo electric receiver.

The plurality of conveyor rollers 108 may be segregated into a plurality of segments, hereinafter referred to as zones, described in detail in FIG. 2A. In each zone, corresponding sensor may be located at a distance downstream of the exit of the zone, further illustrated in FIGS. 2A and 3, of the accumulation conveyor 102. For example, in a first zone, the sensor 110A and corresponding reflector 112A may be located at a distance downstream of the exit of the first zone. Similarly, in a second zone, the sensor 110B and corresponding reflector 112B may be located at a distance downstream of the exit of the second zone. Similarly, in a third zone, the sensor 110C and corresponding reflector 112C may be located at a distance downstream of the exit of the third zone. Similarly, in a fourth zone, the sensor 110B and corresponding reflector 112B may be located at a distance downstream of the exit of the fourth zone.

In an embodiment, a sensor, such as the sensor 110A, may operate by generating a beam (e.g., an electromagnetic beam, visible light beam, infrared beam, and/or the like) and detect any interruption of the beam reflected by a reflector, such as the reflector 112A, back towards the sensor 110A. Alternatively, the reflector 112A may be a receiver for the beam generated by the sensor 110A. The plurality of sensors 110A, 110B, 110C, and 110D may be configured to detect the presence and boundary shape of any article which blocks the beam, and is configured to send a signal to a corresponding control module (shown in FIG. 3) to notify the control module of the presence and boundary shape of the article at corresponding sensor. In various other embodiments, not described herein, other sensors, such as image sensors, may also be used. In fact, any type of sensor that may detect the presence and boundary type of articles being conveyed in front of the sensor may be used, and as used herein, sensor refers to any device in any orientation which is used to detect the presence and boundary type of the article at a location or in an area on accumulation conveyor 102, and thus, is not limited to the photo eyes depicted.

Figure 2A:
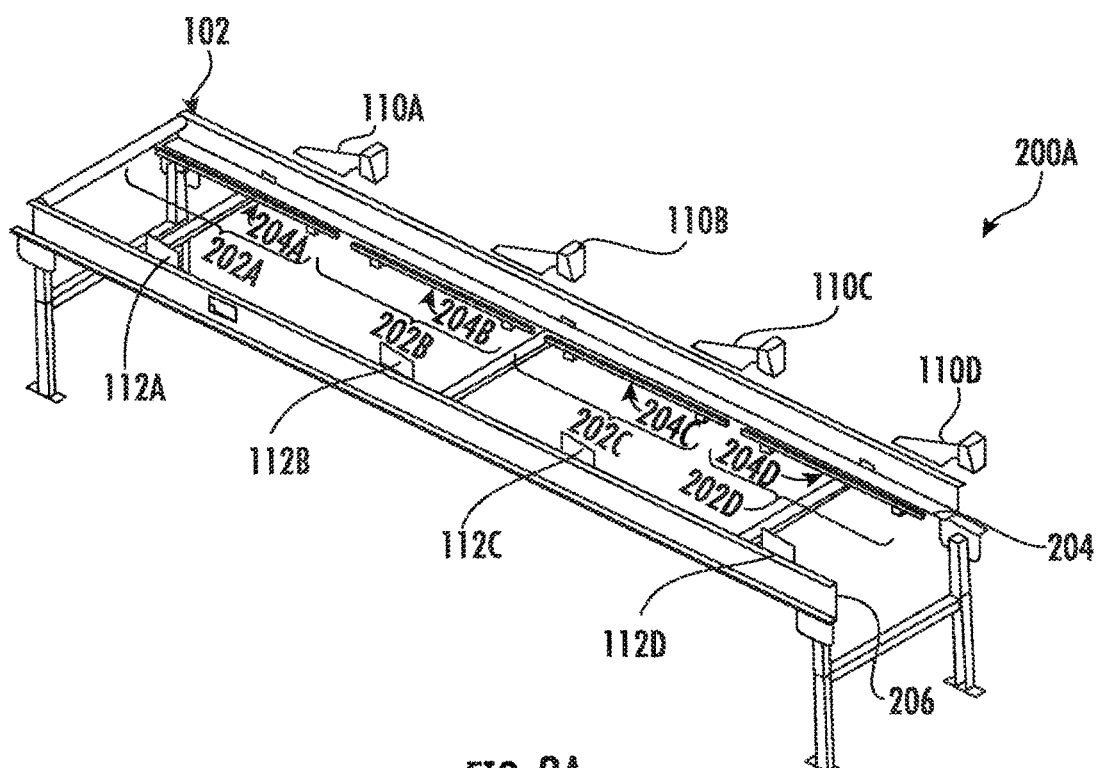
FIG. 2A is a perspective view 200A of a portion of an accumulation conveyor comprising various components, in accordance with one or more embodiments described herein.

FIG. 2A is a perspective view 200A of a portion of the accumulation conveyor 102 comprising various electronic and mechanical components, in accordance with one or more embodiments described herein.

Referring to FIG. 2A, as indicated in FIG. 1, the plurality of conveyor rollers 108 in the accumulation conveyor 102 may be segregated into a plurality of individually controllable segments, referred to as a plurality of zones 202, identified as 202A, 202B, 202C, and 202D. The plurality of individually controllable zones 202 may be defined by respective plurality of drive assemblies 204, identified as 204A, 204B, 204C, and 204D. Each of the plurality of drive assemblies 204 may be controllable independent of the other drive assemblies, making each zone of the plurality of zones 202, individually controllable. Although the length of the plurality of zones 202 may vary, in the embodiment depicted, each zone of the plurality of zones 202 may be 36 inches long. It may be noted that the length of the plurality of zones 202 may be based on various factors, such as length of the plurality of drive assemblies 204 and a plurality of brake assemblies 206, type and size of articles conveyed on the accumulation conveyor 102, and the like, without any deviation from the scope of the disclosure.

Each zone of the plurality of zones 202A, 202B, 202C, and 202D may include respective sensors 110A, 110B, 110C, and 110D connected to the respective control modules (shown in FIG. 3) of respective zones. In the embodiment depicted, the sensors may be photo eyes with respective reflectors 112A, 112B, 112C, and 112D, although any suitable sensor may be used, such as roller sensors or diffused scan sensors. The positions and orientations of the sensors 110A, 110B, 110C, and 110D within the plurality of zones 202A, 202B, 202C, and 202D are selected based on the system parameters, such as length or type of articles conveyed on the accumulation conveyor 102. In an example embodiment, as shown in shown in FIG. 2A, sensors 110A, 110B, 110C, and 110D may be proximal to the discharge or exit end of each zone, such as about one foot from the exit boundary of corresponding zone. However, other suitable locations may also be used, such as proximal to the feed end of each zone, but in such case other configuration may be required to be altered.

With reference to FIG. 2A, as described in FIG. 1, for the plurality of zones 202A, 202B, 202C, and 202D, respective sensors 110A, 110B, 110C, and 110D are disposed at frame side 104 and respective reflectors 112A, 112B, 112C, and 112D are disposed at the opposite frame side 106 of the accumulation conveyor 102. In an example embodiment, the sensors 110A, 110B, 110C, and 110D may be configured to detect a boundary type of an article conveyed by the accumulation conveyor 102 in respective zones of the plurality of zones 202A, 202B, 202C, and 202D, as described in FIGS. 2B-2D. The article may correspond to the one of a first article or a second article. The first article, for example a polybag or a bag, may have an irregular and/or changeable boundary and the second article, for example a carton or a box, may have a regular and/or constant boundary.

In accordance with various embodiments disclosed herein, as further described in detail in FIGS. 6A-6D, movement of the packages or articles having irregular boundaries, such as polybags, as detected by the sensors 110A, 110B, 110C, and 110D may be controlled to maintain suitable gaps therebetween, thereby, resulting in zero-contact accumulation. Further, movement of the packages or articles having regular boundaries, such as cartons, as detected by the sensors 110A, 110B, 110C, and 110D may be controlled to eliminate gaps therebetween, thereby, resulting in zero pressure accumulation. In such a manner, a single conveyor, i.e. the accumulation conveyor 102, may allow for 'coast-to-stop' accumulation for cartons and 'non-contact' accumulation for polybags simultaneously within the same line. Because of separate valves used to control the plurality of drive assemblies 204 and the plurality of brake assemblies 206, the brake assemblies 206 may be used as needed separate from the drive assemblies 204. In this manner, each zone may be enabled to adapt to on-the-fly engagement of the brake assemblies 206 based on the type of the article being conveyed on the accumulation conveyor 102.

Figure 2B:
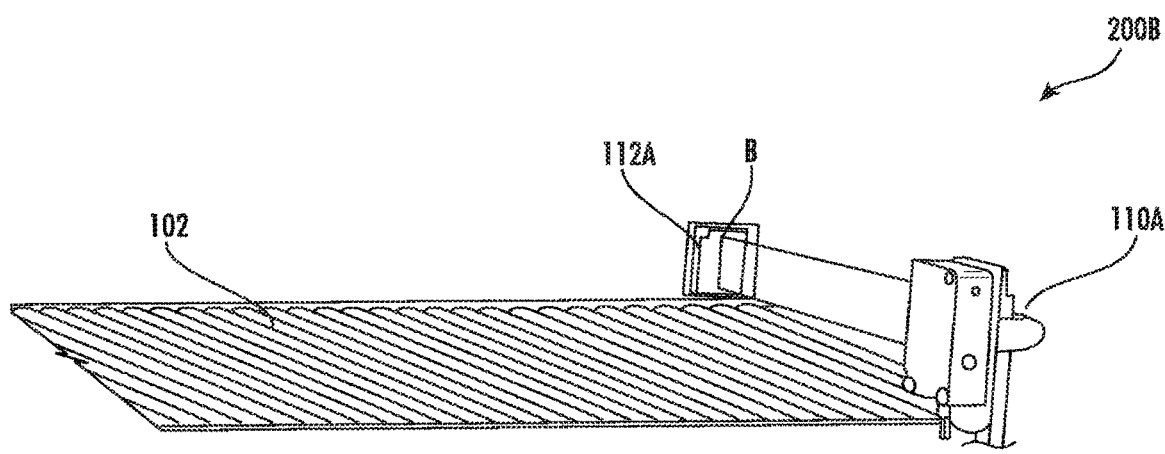
FIGS. 2B-2D illustrate various views 200B-200D of a sensor and a reflector assembly implemented in the accumulation conveyor 102, in accordance with one or more embodiments described herein.
Figure 2C:
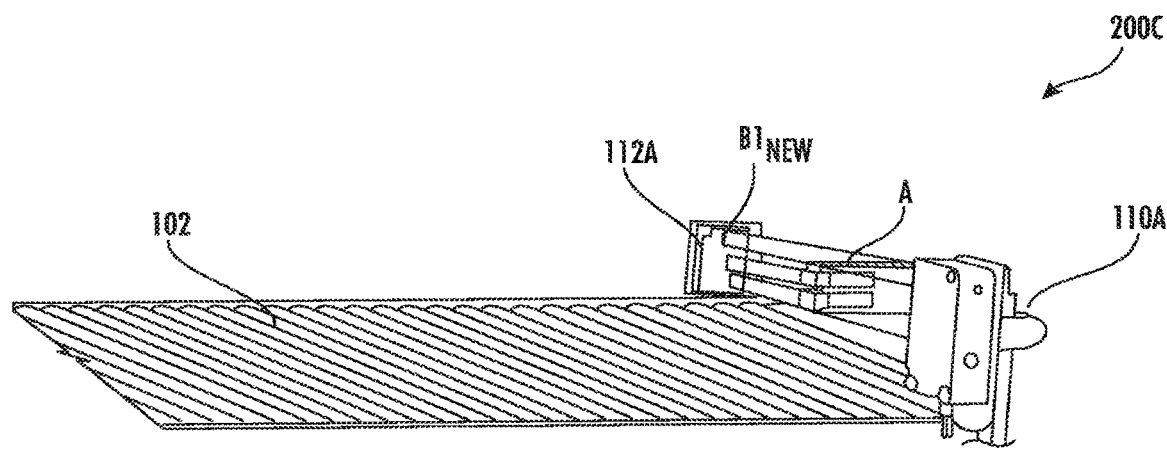
Figure 2D:
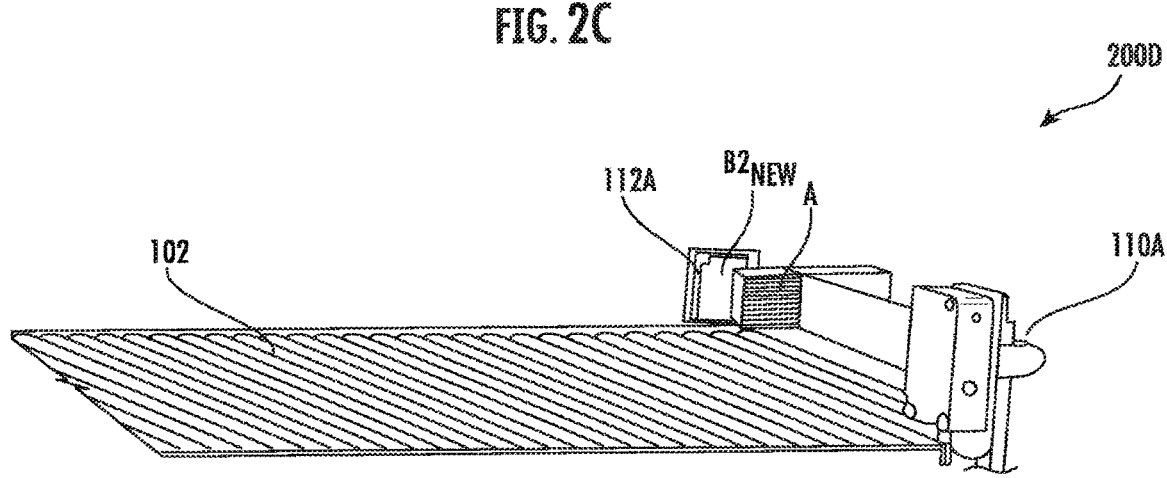

FIGS. 2B-2D illustrate various views 200B-200D of a sensor and a reflector assembly implemented in a zone of the accumulation conveyor 102, in accordance with one or more embodiments described herein. With reference to FIG. 2B, there is shown a sensor, for example the sensor 110A, and corresponding reflector, for example the reflector 112A, located across from one another on opposite sides (e.g., 104, 106) of the accumulation conveyor 102. The sensor 110A may be an array photoelectric sensor configured to emit a light beam towards the reflector 112A. As illustrated in FIG. 2B, the light beam manifests to a straight boundary image "B" projected on the reflector 112A. In certain embodiments, an article "A" being conveyed on the accumulation conveyor 102 may obstruct the light beam, either partially or completely, as a result of which the light beam manifests to a new boundary image projected on the reflector 112A that is registered at a timestamp when the article "A" obstructs the light beam. In an embodiment, as illustrated in FIG. 2C, when the article "A" being conveyed on the accumulation conveyor 102 corresponds to the first article having an irregular boundary, the new boundary image "$B1_{New}$" registered at the timestamp when the article "A" obstructs the light beam, is of an irregular shape. The irregular shape may be to the irregular boundary of the first article that blocks some portion of the light beam and allows the other portions to be projected at the reflector 112A. In another embodiment, as illustrated in FIG. 2D, when the article "A" being conveyed on the accumulation conveyor 102 corresponds to the second article having a regular boundary, the new boundary image "$B2_{New}$" registered at the timestamp when the article "A" obstructs the light beam in its entirety, as the regular boundary of the second article completely blocks the light beam (e.g., the light beam is blocked at each height of the light beam at the same time due to the regular shape of the boundary of the article).

In an embodiment, when located at the entrance portions of respective zones 202A, 202B, 202C, and 202D, the sensors 110A, 110B, 110C, and 110D may be configured to detect articles arriving at an entrance of respective zones 202A, 202B, 202C, and 202D. In another embodiment, when located at the exit portions of respective zones 202A, 202B, 202C, and 202D, the sensors 110A, 110B, 110C, and 110D may be configured to detect articles discharging at the exit of respective zones 202A, 202B, 202C, and 202D. Thus, a location at which an article in the accumulation conveyor 102 is detected by the sensors 110A, 110B, 110C, and 110D depends on the location and orientation of the sensors 110A, 110B, 110C, and 110D, and further, the package size and position of the article on the accumulation conveyor 102.

Figure 2E:
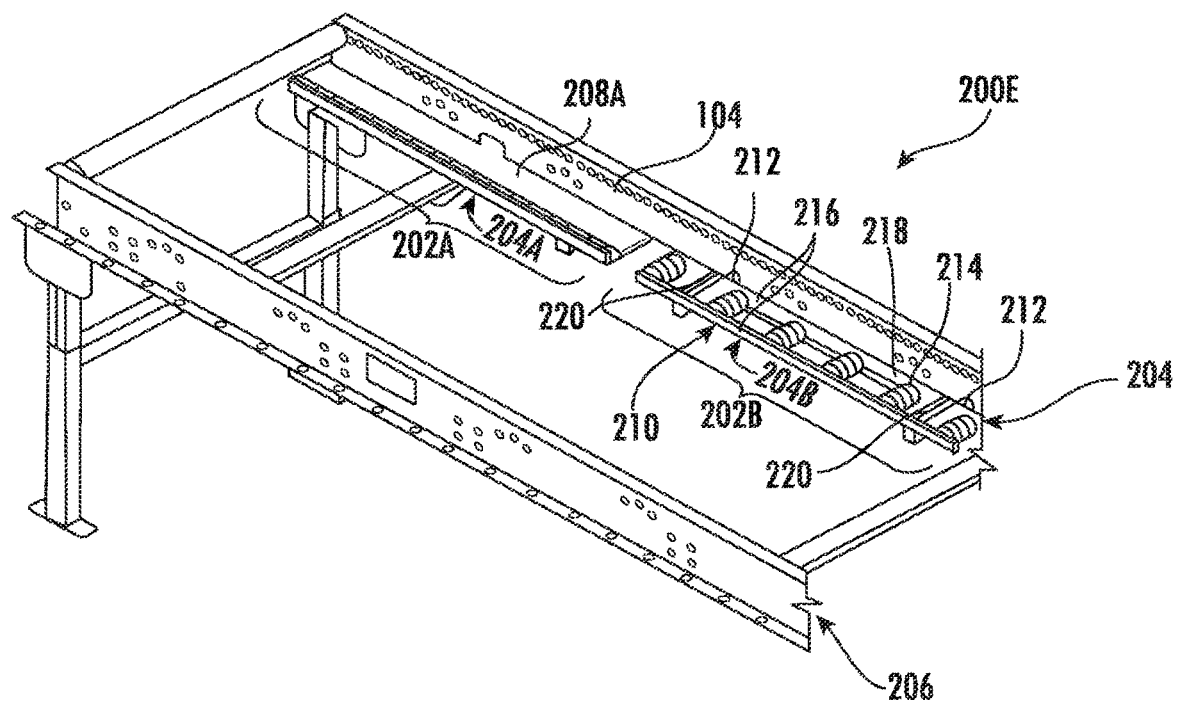
FIG. 2E is a perspective view 200E of a portion of the accumulation conveyor 102 comprising various components, in accordance with one or more embodiments described herein.

FIG. 2E is a perspective view 200E of a portion of the accumulation conveyor 102 comprising various components, in accordance with one or more embodiments described herein.

With reference to FIG. 2E, in conjunction with FIG. 2A-2D, there is shown a drive assembly 204 adjacent to the frame side 104 of the accumulation conveyor 102. The drive assembly 204 may include a plurality of actuators and drive belts, each of which is a single, endless belt within the corresponding zone of the accumulation conveyor 102 driven by a power source. For example, as shown in FIG. 2E, in the first zone 202A, a drive belt 208 may include an upper run 208A, of which a segment of conveyor rollers 108 is, upon actuation of the first zone 202A, urged into driving contact with the lower tangent edge of the segment of the plurality of conveyor rollers 108 in the zone 202A. The drive belt 208 also include a lower run (not seen), which is the lower return portion of the endless drive belt 208. Similarly, other zones, i.e. 202B, 202C, and 202D, also comprise corresponding drive belts, not shown in FIG. 3 for brevity.

Further shown in FIG. 2E is a view of the actuator assembly 204B of the drive assembly 204. As illustrated, the actuator assembly 204B includes an accumulator shoe assembly 210 supported by two or more shoe support brackets 212 extending from frame side 104. Each accumulator shoe assembly 210 includes two spaced apart shoe frame members 216 which carry respective axle retainers. In the depicted embodiment, shoe frame members 216 are made of aluminum, although any sufficiently rigid material may be used. Each axle retainer may include a plurality of preferably uniformly spaced axle receiving slots 218. Accumulator shoe assembly 210 may further include a plurality of spaced apart pressure rollers 214, rotatably supported by respective pressure roller axles that are received by axle receiving slots 218. In an example embodiment, an axle retainer is made of Santoprene®, although any suitably flexible/elastic material may be used, which permits entrance, which is slightly smaller than the diameter of the end of the pressure roller axle, to flex sufficiently to allow the axle end to pass therethrough into an opening, which engages the axle end sufficiently to keep the pressure roller axle retained. Shoe frame members 216 are supported in their spaced apart, generally parallel relationship by two spaced apart members 220, also known as a shoe spreader.

With reference to FIG. 2E, there is shown a brake assembly 206 adjacent to the opposite frame side 106 of the accumulation conveyor 102. The brake assembly 206 may include a plurality of elongated brake pads and stationary supports driven by a power source. Each zone of the accumulation conveyor 102 comprises an elongated brake pad engaged with multiple stationary supports. Further details of the brake assembly 206 has been described in FIGS. 5A and 5C.

Figure 3:
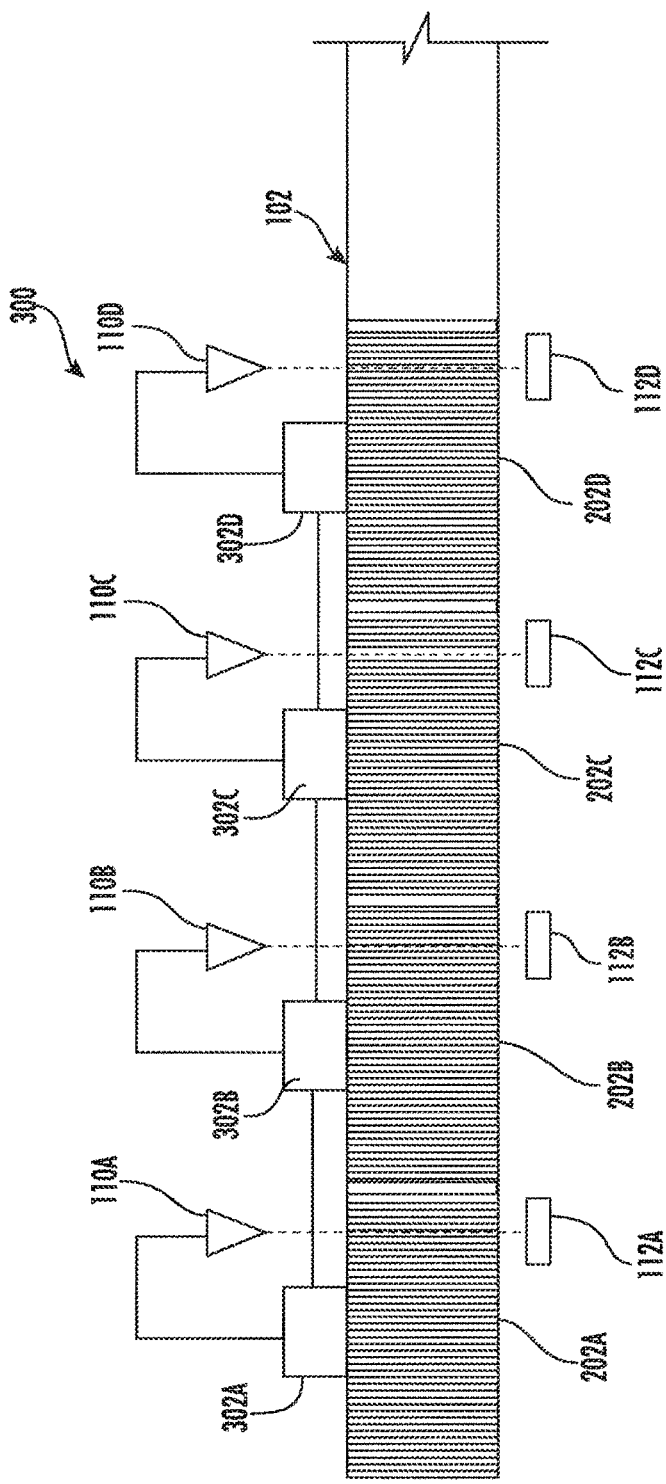
FIG. 3 is a plan view 300 of a portion of the accumulation conveyor 102, in accordance with one or more embodiments described herein.

FIG. 3 is a plan view 300 of a portion of the accumulation conveyor 102, in accordance with one or more embodiments described herein.

As illustrated, the accumulation conveyor 102 may comprise the plurality of individually controllable zones 202A, 202B, 202C, and 202D. Although in the embodiment depicted in FIG. 3 there are four zones, the present disclosure is not limited to four zones only.

In the embodiment depicted, each zone of the accumulation conveyor 102 comprises a segment of the plurality of conveyor rollers 108 (diagrammatically illustrated) which may be selectively driven by urging an underlying drive belt (not shown) against the segments of the plurality of conveyor rollers 108 using pneumatic and/or electric actuators (not shown). There are further shown a plurality of control modules 302A, 302B, 302C, and 302D associated with respective zones 202A, 202B, 202C, and 202D and respective sensors 110A, 110B, 110C, and 110D. In the embodiment depicted, each control module 302A, 302B, 302C, and 302D is configured to control the pneumatic and/or electric actuators (not shown) controlling respective drive and brake assemblies of their respective zones 202A, 202B, 202C, and 202D, and is therefore connected to a pneumatic and/or electric source. The control modules 302A, 302B, 302C, and 302D may be pneumatically and/or electronically daisy chained together.

As described above, each zone of the plurality of zones 202A, 202B, 202C, and 202D includes respective sensors 110A, 110B, 110C, and 110D connected to the respective zones' control modules 302A, 302B, 302C, and 302D. In the embodiment depicted, the sensors 110A, 110B, 110C, and 110D are photo eyes with respective reflectors 112A, 112B, 112C, and 112D, although any suitable sensor may be used, such as roller sensors or diffused scan sensors. The positions and orientations of the sensors 110 within the zones are selected based on the system parameters, such as length or type of packages.

FIGS. 4A-4D diagrammatically illustrate different arrangements 400A-400D of zone control modules and interface modules of the accumulation conveyor 102, in accordance with one or more embodiments described herein.

Figure 4A:
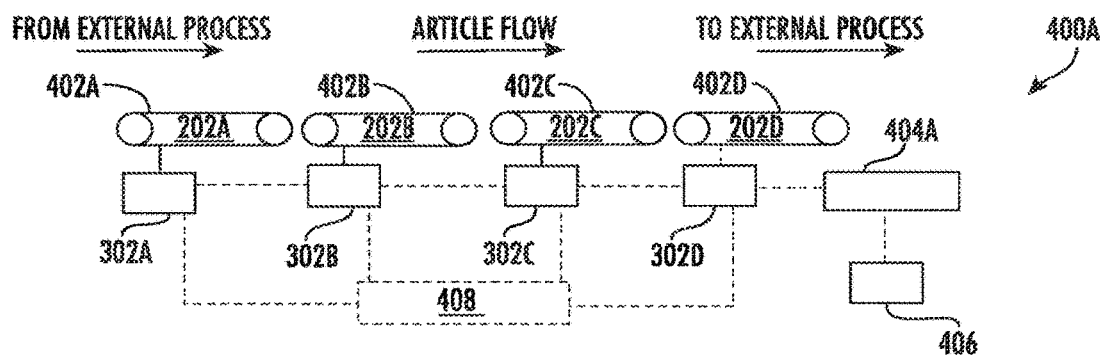
FIGS. 4A-4D diagrammatically illustrate different arrangements of zone control modules and interface modules of the accumulation conveyor 102, in accordance with one or more embodiments described herein.

Referring to FIG. 4A, there is illustrated an arrangement 400A similar to accumulation conveyor 102 of FIG. 3, in which there are four zones 202A, 202B, 202C, and 202D, represented by diagrammatically illustrated conveyor rollers 402A, 402B, 402C, and 402D. The control modules 302A, 302B, 302C, and 302D are disposed to control the respective conveyor rollers 402A, 402B, 402C, and 402D that form the respective zones 202A, 202B, 202C, and 202D.

The system comprising the accumulation conveyor 102 operates via, for example, RC232 communication between control modules 302A, 302B, 302C, and 302D, as illustrated by the lines therebetween in FIGS. 4A-4D. Each of the control modules 302A, 302B, 302C, and 302D is configured to receive detection information from respective sensors (not shown in FIGS. 4A-4D) of each zone respectively. Accordingly, the control modules 302A, 302B, 302C, and 302D may determine the presence, absence and/or type (e.g., first or second article, article with irregular or regular boundary) of article in the respective zone, control the movement of article (pneumatically in the embodiment depicted) within each zone, and allow zone information, signals, and feedback signals to be distributed among the control modules 302A, 302B, 302C, and 302D. Specifically, the control modules 302A, 302B, 302C, and 302D may be configured to determine whether respective sensors are blocked by the first article or the second article in the respective zones 202A, 202B, 202C, and 202D.

In an embodiment, the control module 302D, controlling a single zone, i.e. zone 202D, in the manner discussed above with respect to control modules 302A, 302B, 302C, and 302D, may be further coupled to a discharge interface module 404A. The discharge interface module 404A may be configured to control the direction of travel of the accumulation conveyor 102, through the use of dual in-line package (DIP) switches. In an embodiment, the discharge interface module 404A may be integrated into the control module 302D. It may be noted that the other control modules 302A, 302B, and 302C do have a default direction of travel. The discharge interface module 404A may be further allowed to be configured to use discrete input/output (I/O) 406 to allow control of the movement of articles on the accumulation conveyor 102, allow external systems to monitor the fill state of the accumulation conveyor 102 and allow external systems to monitor fault conditions of the accumulation conveyor 102. FIG. 4A illustrates the use of discharge interface module 404A, by virtue of controlling the single zone which is at the discharge.

Figure 4B:
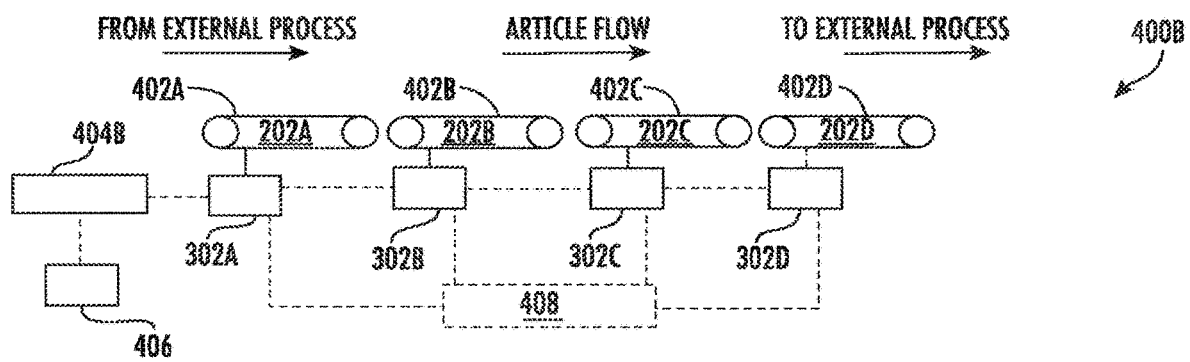

FIG. 4B differs from FIG. 4A in a manner that an infeed interface module 406B is disposed to control infeed conveyor 402A instead of the discharge conveyor 402D. In various embodiments, the infeed interface module 406B may be performing the same functions as the discharge interface module 404A, described in FIG. 4A.

Figure 4C:
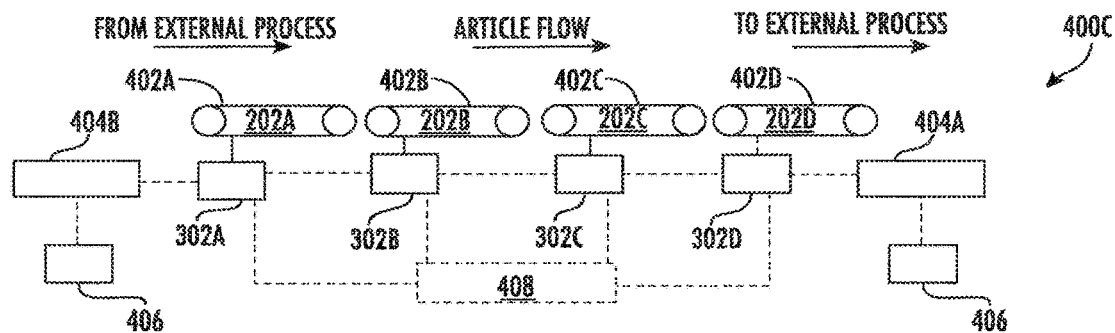

Although it is possible to configure the accumulation conveyor 102 without an interface module, the embodiments depicted herein have two interface modules. Determination of whether to have an infeed or discharge interface module depends mostly on practical consideration based, for example, in convenience, minimizing wiring, which end of the conveyor is desirable to have interface with the line, etc. Alternately, in certain embodiments, as illustrated in FIGS. 4A-4C, there may be further implemented a main controller 408 communicably coupled with each of the plurality of control modules 302A, 302B, 302C, and 302D, and performing the functions of both the interface modules, without any deviation from the scope of the disclosure. For example, the main controller 408 may be configured to perform operations to receive data indicating conditions for each zone of the plurality of zones 202A, 202B, 202C, and 202D. The conditions may comprise at least an operation of the accumulation conveyor 102 in an upstream or downstream direction and a speed of each of the plurality of zones 202A, 202B, 202C, and 202D. Further, the main controller 408 may control movement and direction of a plurality of articles on the accumulation conveyor 102. Furthermore, the main controller 408 may monitor fault conditions associated with one or more of the plurality of zones 202A, 202B, 202C, and 202D, the plurality of sensors 110A, 110B, 110C, and 110D, and the plurality of control modules 302A, 302B, 302C, and 302D.

As may be seen, FIG. 4A illustrates the arrangement 400A of the accumulation conveyor 102 with zones 202A, 202B, 202C, and 202D, with the discharge interface module 404A. FIG. 4B illustrates the arrangement 400B of the accumulation conveyor 102 with zones 202A, 202B, 202C, and 202D, with the infeed interface module 404B. FIG. 4C illustrates the arrangement 400C of the accumulation conveyor 102 with zones 202A, 202B, 202C, and 202D, for which two interface modules are used, i.e. the discharge interface module 404A and the infeed interface module 406B, each of which is configured, as previously described.

Figure 4D:
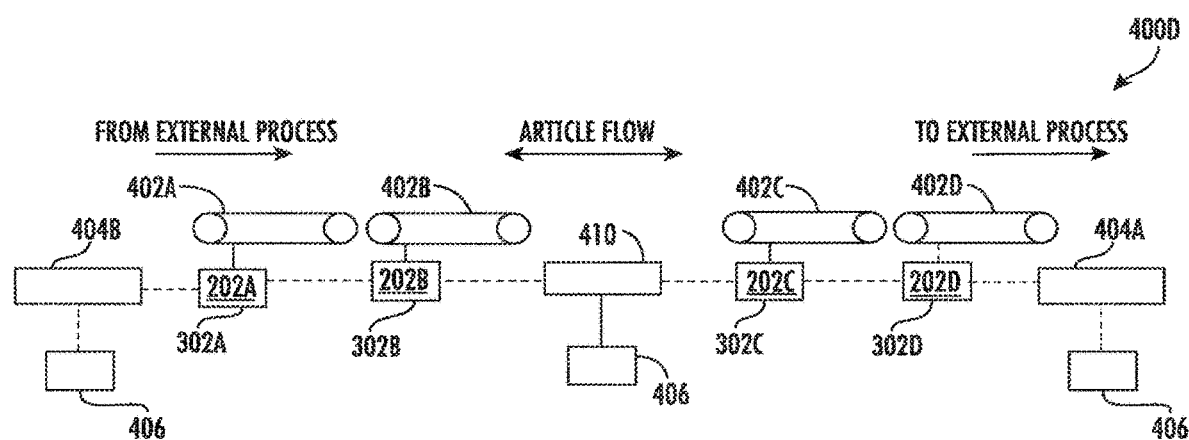

FIG. 4D illustrates the arrangement 400D of the accumulation conveyor 102 in which the direction of article flow is not restricted based on the physical configuration. The system includes an intermediate module 410, being configured to use discrete I/O 406 to allow control of the movement of article on the accumulation conveyor 102, allow external systems to monitor the fill state of the accumulation conveyor 102 and allow external systems to monitor fault conditions of the accumulation conveyor 102. The intermediate module 410 is simply an I/O handler for external system requirements. It is not considered an upstream or downstream device, but when information is passed to it, it may adjust the message per its local I/O settings and send the adjusted message on to its neighbor in the required direction of communication flow. Any number of intermediate modules may be used in any position within the zone control module string. There are also shown in FIG. 4D optional infeed interface module 404B and optional discharge interface module 404A, although it is preferred that each accumulation conveyor have at least one of either. The accumulation conveyor 102 constructed in accordance with the teachings of the present disclosure may operate in accumulation mode unless there is a release signal from an external source, such as a programmable logic controller (PLC).

Figure 5A:
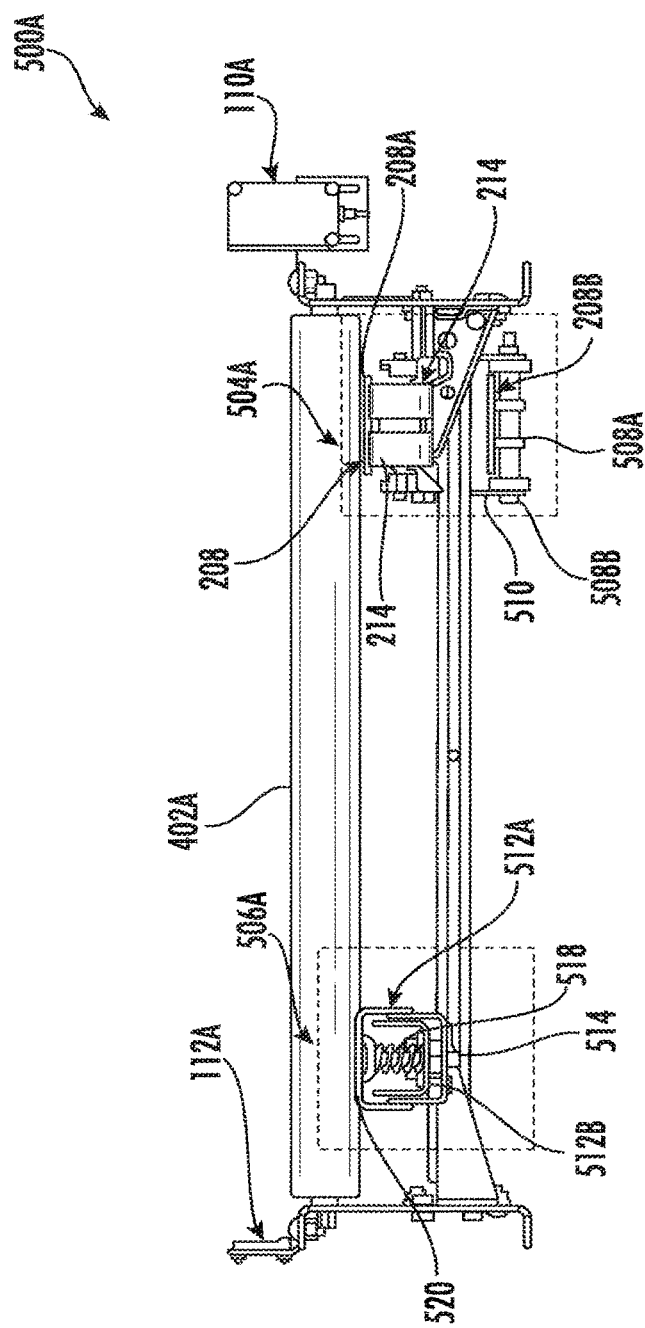
Figure 5B:
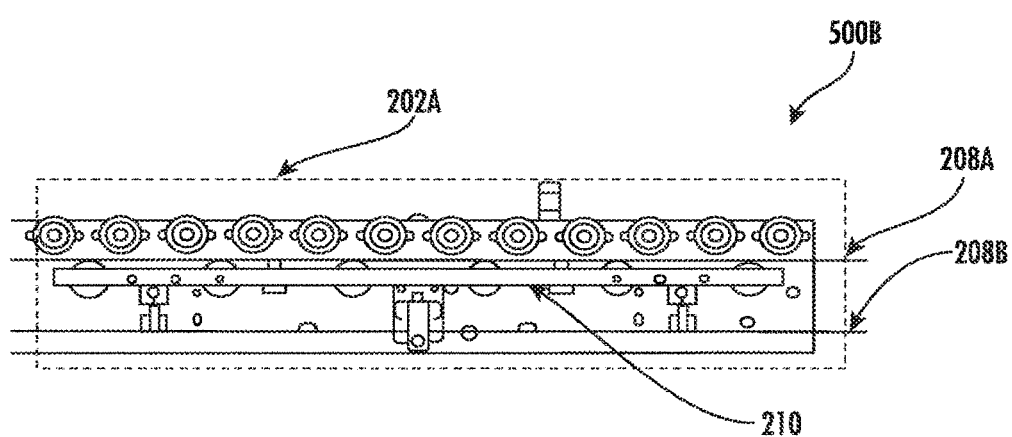

FIGS. 5A-5C illustrate various side views 500A-500C showing a section through the front view and side views of the various mechanical components of an accumulation conveyor 102, in accordance with an embodiment described herein. FIG. 5A illustrates the front view 500A of a section of a first drive assembly 504A and a first brake assembly 506A. The first drive assembly 504A and the first brake assembly 506A may be engaged with or disengaged from a segment of the plurality of conveyor rollers 108, for example conveyor rollers 402A, of which one conveyor roller 502A is illustrated in FIG. 5A. The engagement/disengagement of the first drive assembly 504A and the first brake assembly 506A with/from the conveyor rollers 402A may be controlled by the corresponding control module, for example 302A, of the corresponding zone, for example 202A.

As seen in FIGS. 5A and 5B, the lower run 208B of the drive belt 208 may be supported by a pair of spaced apart bearings 508A, supported by shaft 510 by a bracket extending downwardly from frame cross member. Shaft 510 also supports a larger pair of spaced apart bearings 508B with outer diameters sufficiently large enough to retain the lower run 208B on the sides, providing rolling action when contacted thereby. Both pairs of bearings are precision bearings to reduce noise.

In an embodiment, the drive belt 208 may include a centrally located rib (not shown) which may be shaped complementarily to a notch in the pressure roller 214, with adequate root and side clearance as may be needed for proper tracking. In the depicted embodiment, for example, drive belt 208 is two inches wide, with the pressure roller 214 extending about three-eighths of an inch beyond on either side, although any suitable belt and roller widths may be used.

The drive belt 208 may be made from typical known materials for drive belts. In the depicted embodiment, in the non-actuated position, the upper run 208A of the drive belt 208 is about three sixteenths of an inch from the lower surface of the conveyor roller 502A. When actuated, a driving control valve may be selectively connected to a pneumatic pressure source under the control of the control module 302A and the accumulator shoe assembly 210 is moved upwards to urge the upper run 208A of the drive belt 208 into driving contact with the conveyor rollers 402A by the pressure rollers 214. Thus, the upper run 208A of the drive belt 208 engages with the conveyor rollers 502, thereby urging the conveyor rollers 402A to rotate. Upon deflation, the accumulator shoe assembly 210 is moved downwards and the upper run 208A of the drive belt 208 is disengaged from the conveyor rollers 402A under the control of the control module 302A.

In an embodiment, brake assembly 206 includes an elongated brake pad 520 which controllably abuts against the underside of the conveyor rollers 402A and thereby selectively prevents them from rotating. The elongated brake pad 520 may be located on a first movable support 512A which in turn is engaged with a second support 512B. The second support 512B is stationary and attached to frame member of the accumulation conveyor 102 through triangular shaped brackets. When actuated by the pneumatic pressure source under the control of the control module 302A, the first movable support 512A and the other support 514 move down together. Accordingly, the elongated brake pad 520 disengages from the underside of the conveyor rollers 502, thereby facilitating rotation. Upon deflation, under the influence of the spring member 518, the first movable support 512A and the other support 514 move up together. Accordingly, the elongated brake pad 520 engages with the underside of the conveyor rollers 502, thereby preventing rotation. While the illustrated first brake assembly 506A is elongated sufficiently to engage multiple conveyor rollers at a time, this can, of course be varied. In fact, any types of brakes that substantially prevent movement of articles over a defined area of accumulation conveyor 102 can be used within the scope of the invention.

In an embodiment, each control valve of the driving control valve and the braking control valve may be operably coupled to the pneumatic pressure source. When an "on" signal is received from corresponding control module, the driving control valve connects the pneumatic pressure source to the drive assembly in the respective zone, thereby causing the activated drive assembly to engage with the conveyor rollers and start the rotation of the conveyor rollers. When an "off" signal is received from corresponding control module, the driving control valve allows the pressurized air being delivered to the drive assembly to be vented in the respective zone, thereby causing the activated drive assembly to disengage from the conveyor rollers.

Alternately, when an "off" signal is received from corresponding control module, the pneumatic pressure source actuates the brake assembly in the respective zone, thereby causing the brake assembly to disengage from the conveyor rollers and facilitate the rotation of the conveyor rollers. When an "on" signal is received from corresponding control module, the pressurized air being delivered to the brake assembly is vented in the respective zone, thereby causing the brake assembly to engage with the conveyor rollers, thereby stopping the rotation of the conveyor rollers. It may be noted that the braking assemblies in different zones may be controlled independently from each other based on control signals received from corresponding control modules.

The first drive assembly 504A and the first brake assembly 506A of the conveyor rollers 402A in the first zone 202A may be controlled by the control module 302A based on a feedback signal received from the next (e.g., immediately downstream) control module and a signal received from the previous (e.g., immediately upstream) control module. In an example embodiment, the feedback signal received from the next control module indicates that the sensor in the next (e.g., immediately downstream) zone is blocked and the signal received from the previous (e.g., immediately upstream) control module indicates that the article entering in the first zone 202A is an article having a regular boundary, the first drive assembly 504A of the conveyor rollers 402A in the first zone 202A may be disengaged. Accordingly, the article being conveyed on the conveyor rollers 402A coasts to a stop with zero-pressure accumulation as soon as the sensor in the first zone 202A is blocked. In such embodiment, the first sensor in the first zone 202A may transmit a feedback signal to the previous control module in the previous zone. Upon receiving the feedback signal, the previous control module may control the first drive assembly 504A in such a manner that the article being conveyed by the previous conveyor rollers in the previous zone is stopped with zero-pressure with respect to the article at rest in the first zone 202A.

In another example embodiment, the feedback signal received from the next control module indicates that the sensor in the next zone is blocked and the signal received from the previous control module indicates that the article entering in the first zone 202A is an article having an irregular boundary, the first drive assembly 504A of the conveyor rollers 402A in the first zone 202A may be disengaged until the article being conveyed on the conveyor rollers 402A blocks the sensor in the first zone 202A. Accordingly, the first brake assembly 506A may be engaged and the article being conveyed on the conveyor rollers 402A immediately stops with zero-contact accumulation as soon as the sensor in the first zone 202A is blocked. In such embodiment, the first sensor in the first zone 202A may transmit a feedback signal to the previous (e.g., immediately upstream) control module in the previous zone. Upon receiving the feedback signal, the previous control module may control the first drive assembly 504A and the first brake assembly 506A in such a manner that the article being conveyed by the previous conveyor rollers in the previous zone is stopped with zero-contact with respect to the article at rest in the first zone 202A.

FIGS. 6A-6D are flow diagrams 600A-600D illustrating example methods for controlling the accumulation conveyor 102, in accordance with various embodiments described herein. FIGS. 6A-6D are described in conjunction with FIGS. 7A-7F and 8A-8D. FIGS. 7A-7F illustrate schematic views 700A-700F of an article being conveyed by multiple zones, in accordance with various embodiments described herein. FIGS. 8A-8D illustrate schematic views 800A-800D of various use cases, in accordance with various embodiments described herein.

It will be understood that each block of the flowchart, and combinations of blocks in the flowchart, may be implemented by various means, such as hardware, firmware, one or more processors, circuitry and/or other devices associated with execution of software including one or more computer program instructions. For example, one or more of the procedures described herein may be embodied by computer program instructions. In this regard, the computer program instructions which embody the described procedures may be stored by a memory of the accumulation conveyor 102 employing an embodiment of the present disclosure and executed by a processor or control modules 302A, 302B, 302C, and 302D in the accumulation conveyor 102.

As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a specific manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 6A-6D, when executed, convert a computer or processing circuitry into a specific machine configured to perform an example embodiment of the present invention. Accordingly, the operations of FIGS. 6A-6D define algorithms for configuring a computer or processor, to perform an example embodiment. In some cases, a general-purpose computer may be provided with an instance of the processor which performs the algorithms of FIGS. 6A-6D to transform the general-purpose computer into a specific machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

For the purpose of understanding the algorithms of FIGS. 6A-6D, as introduced in FIG. 3, three exemplary zones 202A-202C having respective control modules 302A-302C and respective sensors 110A-110C with respective reflectors 112A-112C are considered while describing the operations depicted in algorithms of FIGS. 6A-6D. Each zone may be having separate drive and brake assemblies controlled by respective control modules. For example, the first zone 202A may be having the first drive assembly 504A and the first brake assembly 506A (as described in FIGS. 5A-5C) controlled by corresponding first control module 302A. Similarly, the second zone 202B may be having second drive assembly 504B and second brake assembly 506B (similar to the first drive assembly 504A and first brake assembly 506A respectively) controlled by corresponding second control module 302B. Similarly, the third zone 202C may be having third drive assembly 504C and third brake assembly 506C (similar to the first drive assembly 504A and first brake assembly 506A respectively) controlled by corresponding third control module 302C. It may be noted that the first zone 202A is upstream of the second zone 202B, and the second zone 202B is upstream of the third zone 202C. Further, the first zone 202A may be controlled by infeed interface module 404B in addition to the first control module 302A, and the third zone 202C may be controlled by discharge interface module 404A in addition to the third control module 302C. Remaining zones, such as the second zone 202B, may be controlled by corresponding control modules, such as the second control module 302B, only.

Figure 6A:
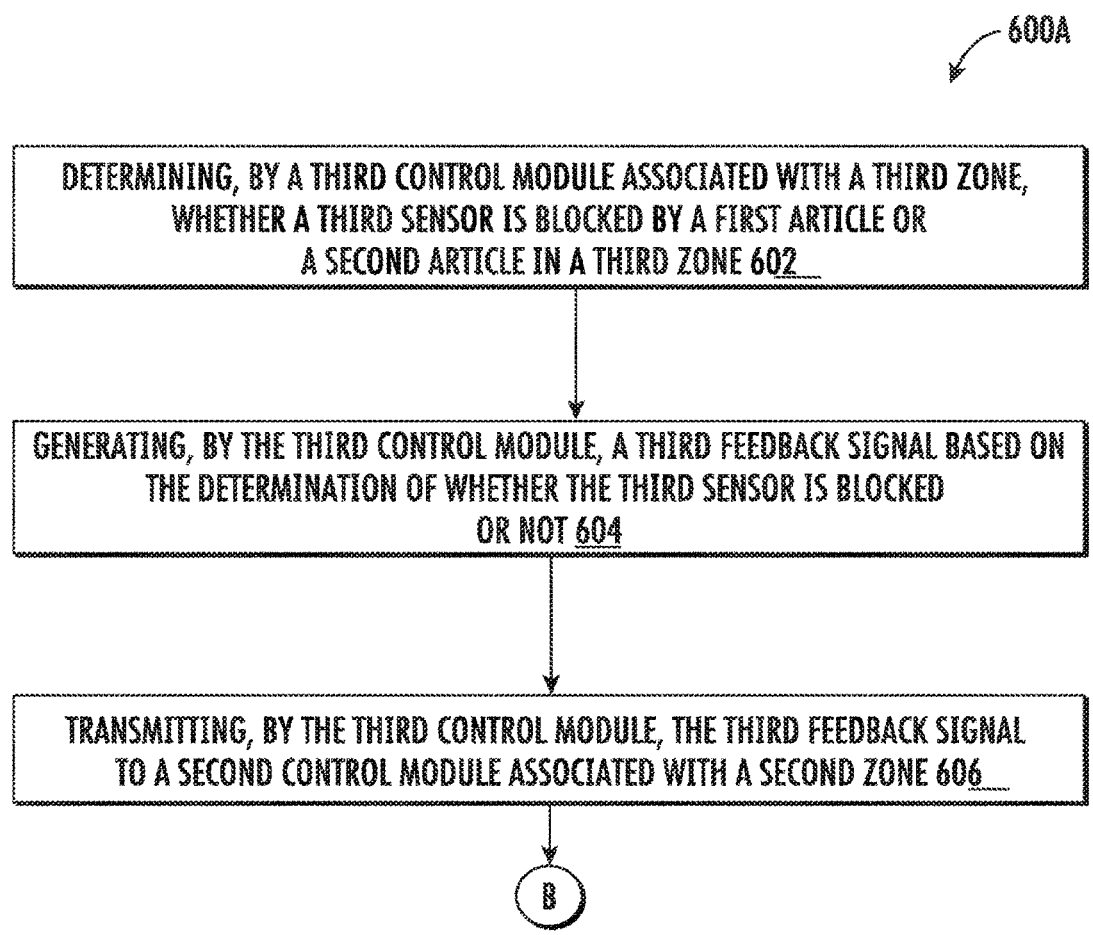
FIGS. 6A-6D are flow diagrams illustrating example methods for controlling an accumulation conveyor, in accordance with various embodiments described herein.
Figure 6B:
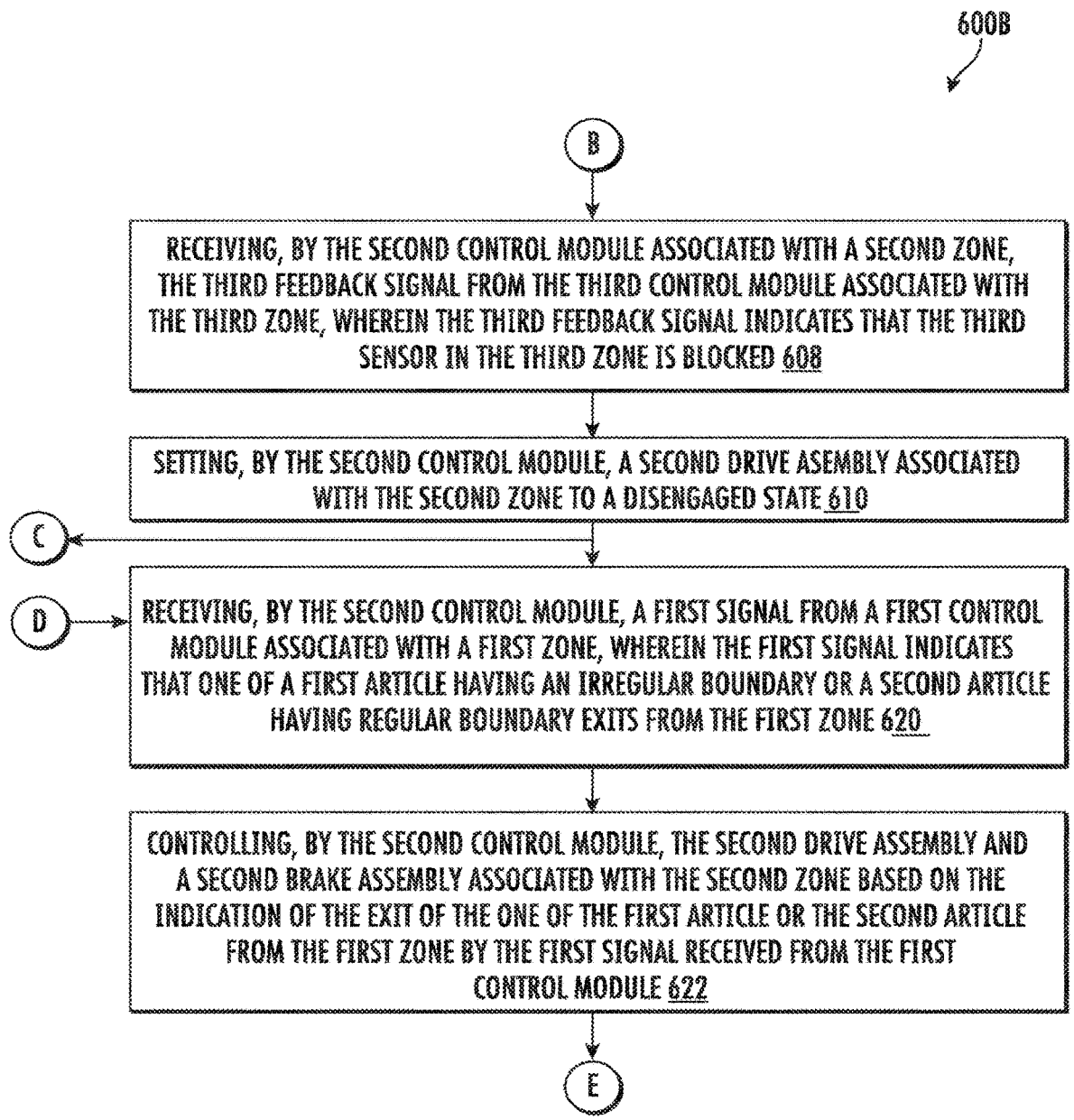
Figure 6C:
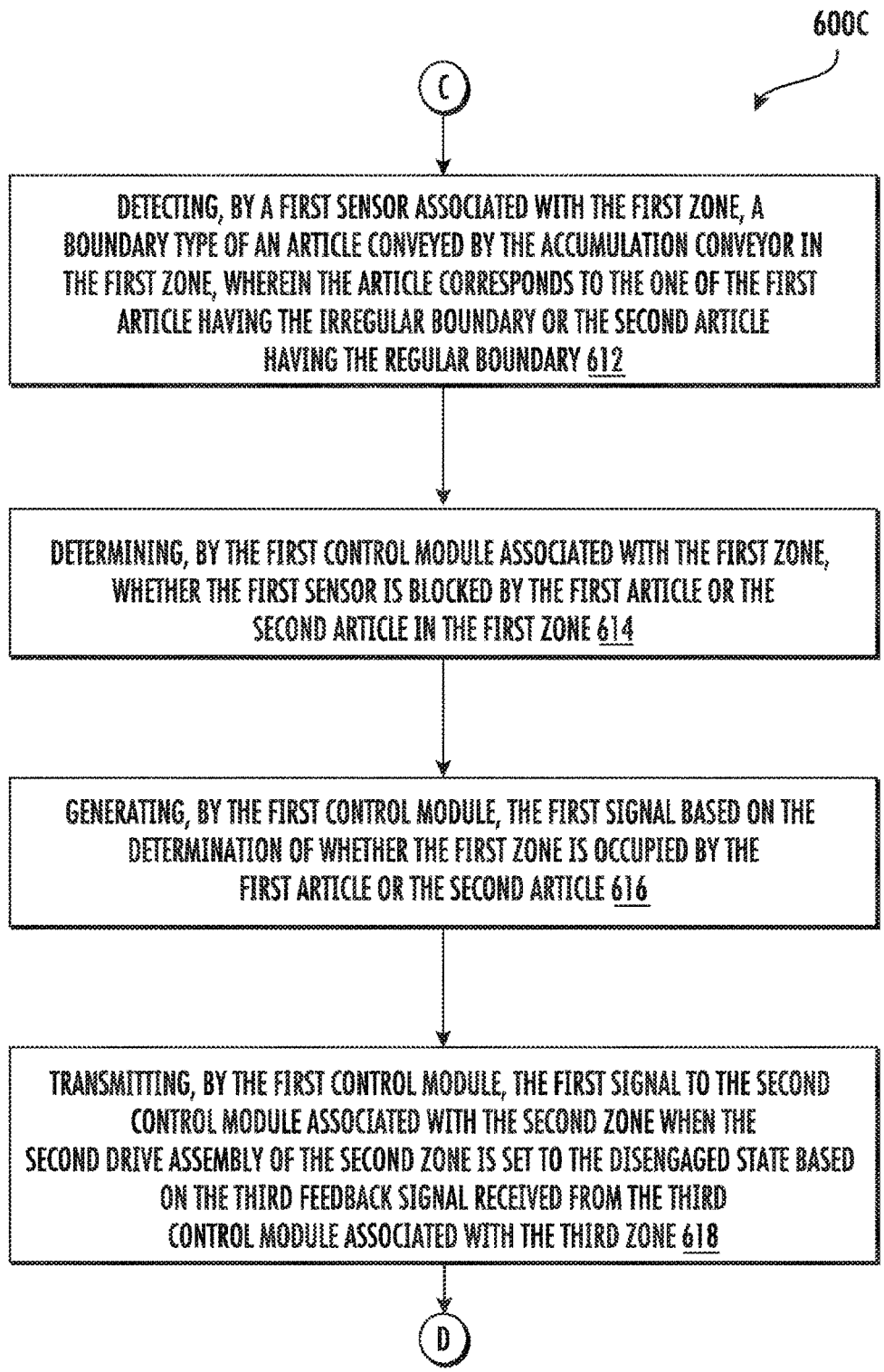
Figure 6D:
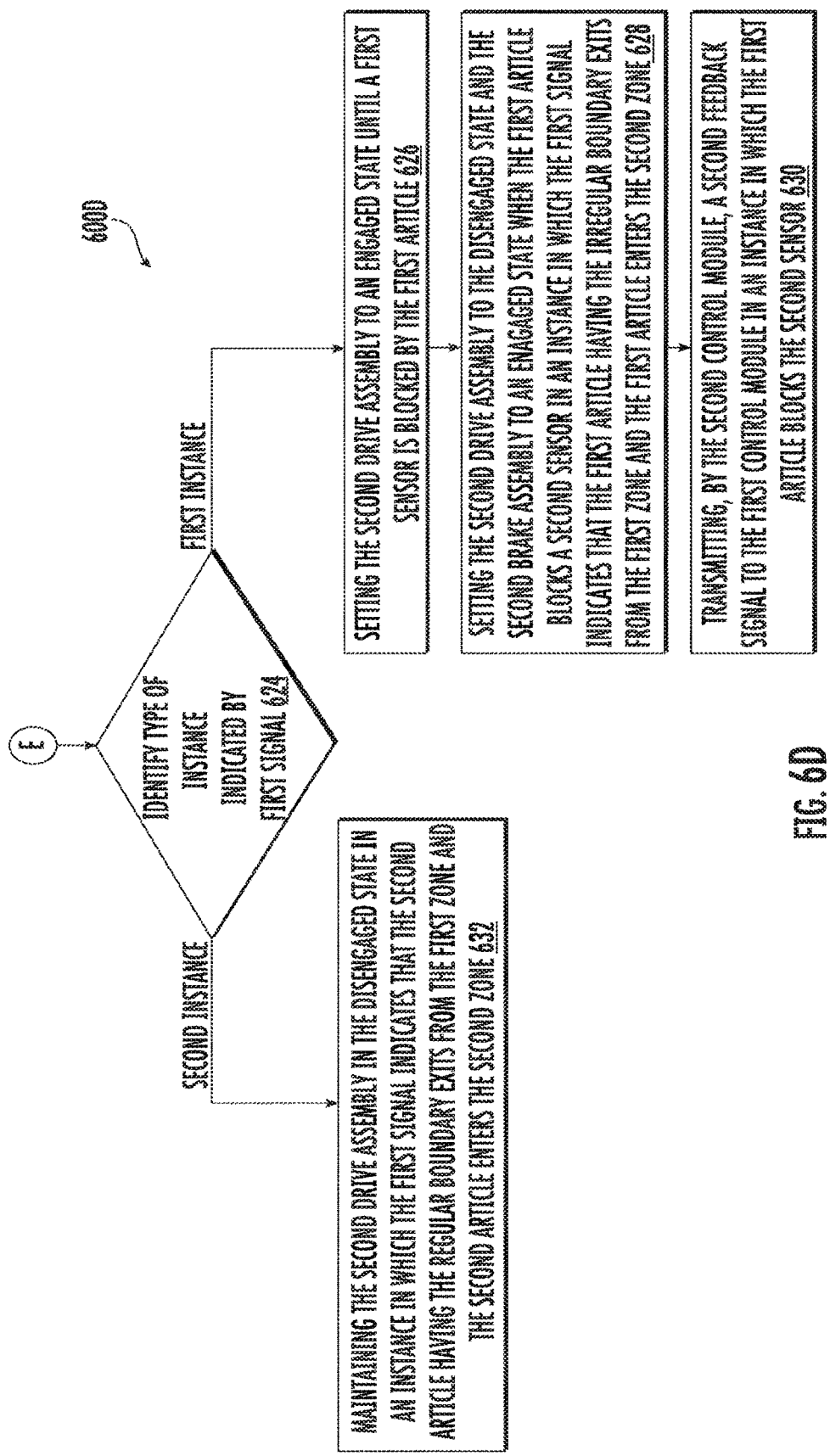

As described herein forth, FIG. 6A is a flow diagram 600A illustrating transmission of a feedback signal from the third control module 302C to the second control module 302B. FIG. 6B is a flow diagram 600B illustrating controlling of the second zone 202B by the second control module 302B. FIG. 6C is a flow diagram 600C illustrating transmission of a signal from the first control module 302A to the second control module 302B. FIG. 6D is a flow diagram 600D illustrating controlling drive and brake assemblies based on a type of article. It may be noted that for brevity, the algorithms of FIGS. 6A-6C have been described with respect to the zones 202A-202C. However, the present disclosure may be contemplated to implement same algorithm to each set of three zones in the accumulation conveyor 102.

Turning to operation 602 in FIG. 6A, the accumulation conveyor 102 may include means, such as the third control module 302C associated with the third zone 202C, for determining whether the third sensor 110C is blocked by an article in the third zone 202C. The article may be one of the first article or the second article. As described above, the first article, for example a polybag or a bag, may have an irregular boundary and the second article, for example a carton or a box, may have a regular boundary.

As used herein, a sensor may be blocked when the sensor's output is in a state consistent with not seeing the reflector implying that the article is being detected by the local zone sensor directly (without time delay—it is actual sensor state). The sensor may send corresponding signal to corresponding control module based on which the control module may determine that the sensor is blocked. Further, a zone may be considered occupied when the corresponding sensor has been blocked and a time delay period has expired. A zone is considered not occupied when the sensor is clear (not blocked) and the time delay period has expired. The sensor time delay period is set by DIP switch position on the most downstream interface module. The time delay period set by DIP switches is applied to all modules in the string and their corresponding sensors. In an example embodiment, the time delay period for determining whether a zone is occupied is different than the time delay period for determining whether a zone is clear. In an example embodiment, the time delay period for determining whether a zone is occupied is the same as the time delay period for determining whether a zone is clear. In one embodiment, DIP switches allowed the delay to be set at zero, 0.75 seconds, 1.0 seconds or 1.5 seconds.

Figure 7A:
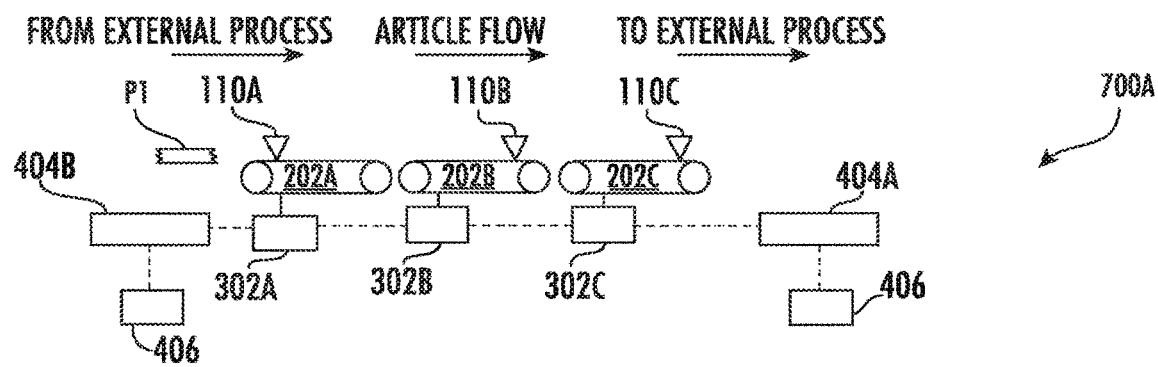
FIGS. 7A-7F illustrate schematic views of an article being conveyed by multiple zones, in accordance with various embodiments described herein.
Figure 7B:
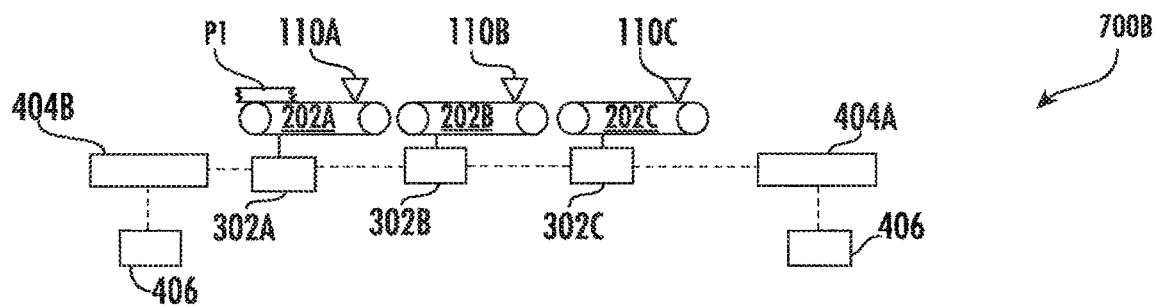
Figure 7C:
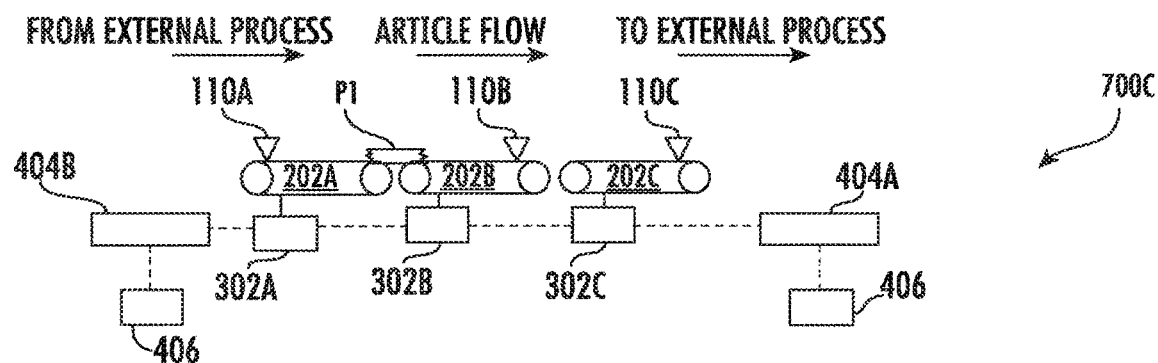
Figure 7D:
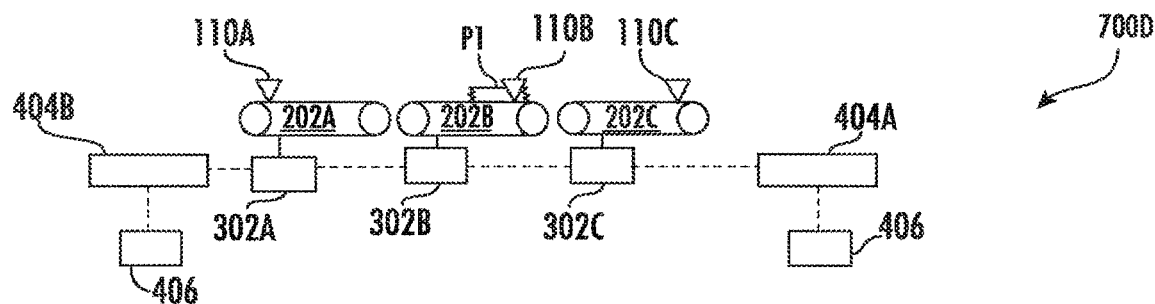
Figure 7E:
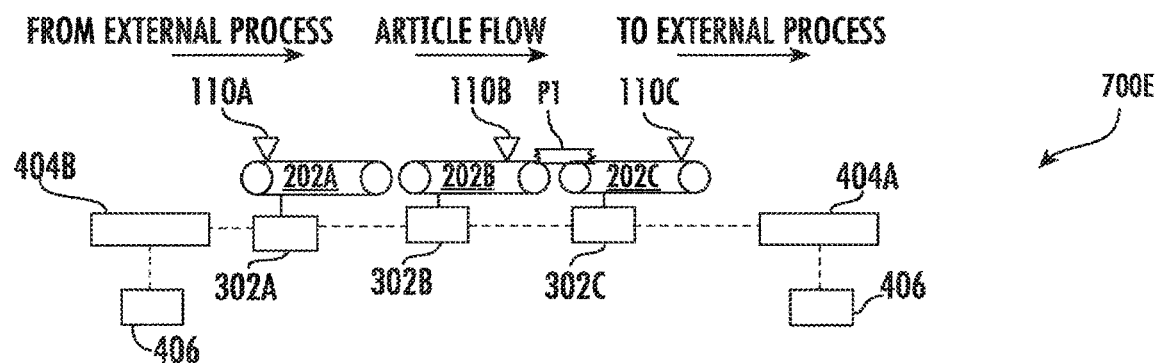
Figure 7F:
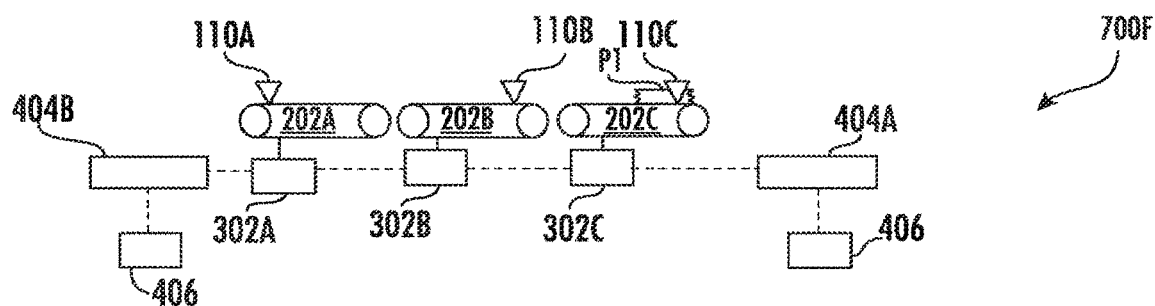

Referring to FIGS. 7A-7F, there is illustrated a complete traversal of a first instance of the first article "P1" through the first zone 202A and the second zone 202B till the third zone 202C. FIG. 7A to 7B illustrate the first instance of the first article "P1" entering the first zone 202A and passing the first sensor 110A. FIG. 7C illustrates the first instance of the first article "P1" transferring to the second zone 202B. In FIG. 7D, the second sensor 110B becomes occupied by the first instance of the first article "P1", stopping the first zone 202A, while the second zone 202B remains active. FIG. 7E shows the first instance of the first article "P1" transferring to the third zone 202C, with sensor 110B becoming unoccupied, and the first zone 202A starting. FIG. 7F illustrates the first instance of the first article "P1" coasting to a stop, since the third zone 202C is inactive, and causing sensor in the third sensor 110C to become occupied, thereby stopping the second zone 202B.

Figure 8A:
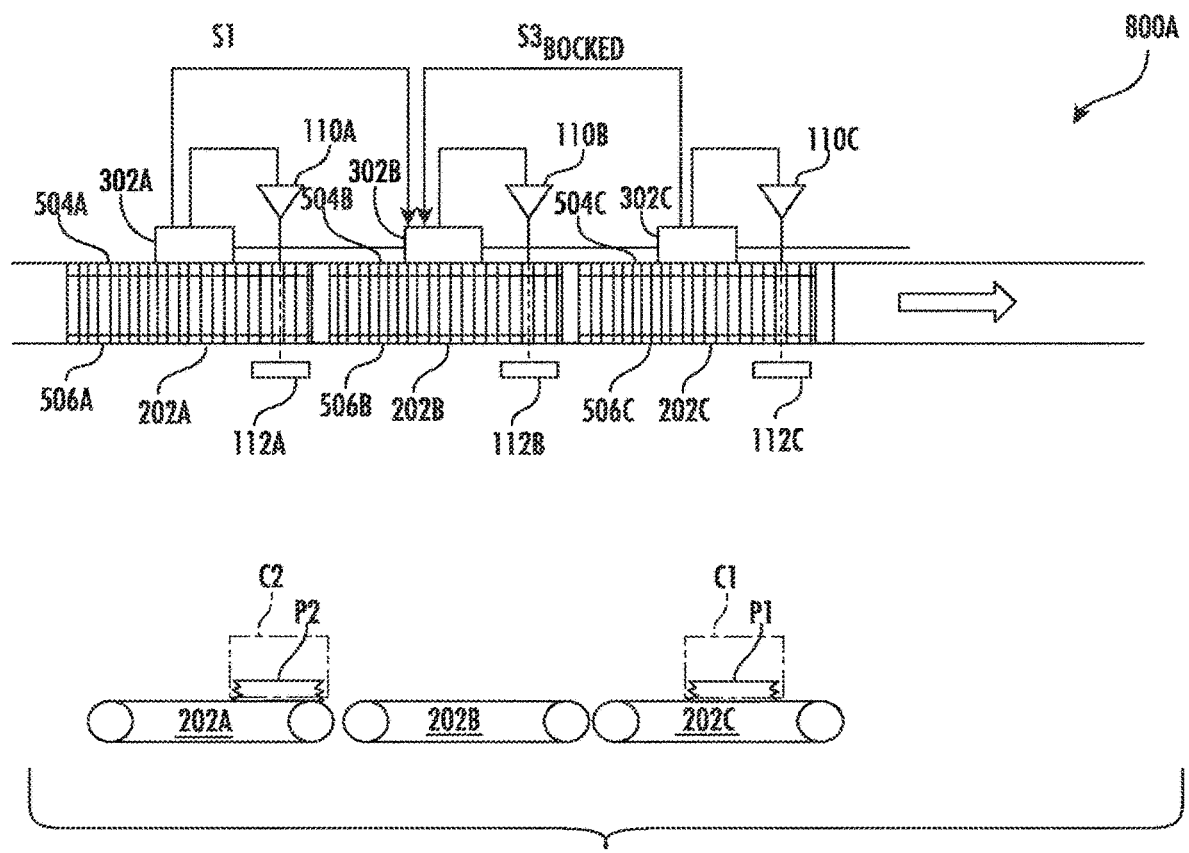
FIGS. 8A-8D illustrate schematic views of various use cases, in accordance with various embodiments described herein.

Thus, as illustrated in FIG. 8A, the first instance of the first article "P1" may be placed on conveyor rollers 402C of the third zone 202C in such a manner that the time delay period is expired, based on which the third control module 302C may determine that the third sensor 110C is blocked by an article in the third zone 202C. It may be noted that instead of the first instance of the first article "P1", a first instance of the second article "C1" may also be placed on the conveyor rollers 402C of the third zone 202C. Such first instance of the second article "C1" will also block the third sensor 110C in the third zone 202C, in the similar manner as described above.

Turning to operation 604, the accumulation conveyor 102 may include means, such as the third control module 302C, for generating a third feedback signal based on the determination of whether the third sensor 110C is blocked or not. In an instance, the third feedback signal may be indicated by "$S3_{Blocked}$" based on the determination that the third sensor 110C is blocked. Referring to FIGS. 8A-8D, either the first instance of the first article "P1" or the first instance of the second article "C1" blocks the third sensor 110C, the third control module 302C may generate the third feedback signal "$S3_{Blocked}$".

Turning to operation 606, the accumulation conveyor 102 may include means, such as the third control module 302C associated with the third zone 202C, for transmitting the third feedback signal, indicated by "$S3_{Blocked}$", to the second control module 302B associated with the second zone 202B. Thus, the third feedback signal, indicated by "$S3_{Blocked}$" is transmitted upstream to the second control module 302B, as illustrated in FIGS. 8A-8D. In an embodiment, the third control module 302C may be configured to transmit the third feedback signal, indicated by "$S3_{Blocked}$", to the second control module 202B, via an RS232 communication interface, for example. Control passes to operation 608 in FIG. 6B.

Turning to operation 608 in FIG. 6B, the accumulation conveyor 102 may include means, such as the second control module 302B associated with the second zone 202B, for receiving the third feedback signal, indicated by "$S3_{Blocked}$", from the third control module 302C associated with the third zone 202C. As described above, in the instance wherein the third feedback signal, indicated by "$S3_{Blocked}$", indicates that the third sensor 110C in the third zone 202C is blocked.

Turning to operation 610, the accumulation conveyor 102 may include means, such as the second control module 302B associated with the second zone 202B, for setting the second drive assembly 504B associated with the second zone 202B to a disengaged state. In such case, as described above, the second control module 302B may transmit an "off" signal to the second drive assembly 504B, due to which the driving control valve allows the pressurized air being delivered to the second drive assembly 504B to be vented in the second zone 202B. This may cause the activated second drive assembly 504B to disengage from the second conveyor rollers 402B. Specifically, upon deflation, the accumulator shoe assembly 210 is moved downwards and the upper run 208A of the drive belt 208 is disengaged from the conveyor rollers 402B under the control of the second control module 302B.

Thus, in an instance, when the third feedback signal, indicated by "$S3_{Blocked}$", is received from the third control module 302C, the second control module 302B may be configured to set the second drive assembly 504B associated with the second zone 202B to a disengaged state. Meanwhile, a second instance of the first article "P2" or a second instance of the second article "C2" may be progressing down from the first zone 202A to the second zone 202B much in the same manner as the first instance of the first article "P1" or the first instance of the second article "C1", coasted to a stop to block the second sensor 110B of the second zone 202B. Control passes to operation 612 in FIG. 6C.

Turning to operation 612 in FIG. 6C, the accumulation conveyor 102 may include means, such as the first sensor 110A associated with the first zone 202A, for detecting a boundary type of the article, i.e. the second instance of the first article "P2" or the second instance of the second article "C2", exiting the first zone 202A and entering the second zone 202B. The article may correspond to the one of the second instance of the first article "P2" having the irregular boundary, such as a polybag, or the second instance of the second article "C2" having the regular boundary, such as a carton.

For example, referring to FIG. 8A, the first sensor 110A may detect the boundary type of the article, i.e. the irregular boundary type of the second instance of the first article "P2" or the regular boundary type of the second instance of the second article "C2", based on the mechanism described in FIGS. 2B and 2C.

Turning to operation 614, the accumulation conveyor 102 may include means, such as the first control module 302A associated with the first zone 202A, for determining whether the first sensor 110A is blocked by the first article or the second article in the first zone 202A. In other words, the first control module 302A may determine whether the first sensor 110A is blocked by the second instance of the first article "P2", i.e. a polybag, or the second instance of the second article "C2", i.e. a carton, in the first zone 202A.

Turning to operation 616, the accumulation conveyor 102 may include means, such as the first control module 302A associated with the first zone 202A, for generating the first signal "S1" based on the determination of whether the first zone 202A is occupied by the second instance of the first article "P2" or the second instance of the second article "C2", as shown in FIG. 8A. Accordingly, the first signal "S1" comprises information that the second instance of the first article "P2" is exiting the second zone 202B and entering the third zone 202C. Alternately, the first signal "S1" comprises information that the second instance of the second article "C2" is exiting the second zone 202B and entering the third zone 202C.

Turning to operation 618, the accumulation conveyor 102 may include means, such as the first control module 302A associated with the first zone 202A, for transmitting the first signal "S1" to the second control module 302B. In an embodiment, the first control module 302A may be configured to transmit the first signal, indicated by "S1", to the second control module 302B via an RS232 communication interface, for example. Control passes to operation 620 in FIG. 6B.

Turning to operation 620 in FIG. 6B, the accumulation conveyor 102 may include means, such as the second control module 302B associated with the second zone 202B, for receiving the first signal "S1" from the first control module 302A associated with the first zone 202A. The first signal "S1" indicates that one of a first article having an irregular boundary or a second article having a regular boundary is exiting from the first zone 202A and entering the second zone 202B. In an embodiment, the second control module 302B may be configured to receive the first signal, indicated by "S1", from the first control module 302A via an RS232 communication interface, for example. For example, the first signal "S1" indicates that the second instance of the first article "P1" is a polybag having an irregular boundary or the second instance of the second article "C2" is a carton having a regular boundary, is exiting from the first zone 202A and entering the second zone 202B.

Turning to operation 622, the accumulation conveyor 102 may include means, such as the second control module 302B associated with the second zone 202B, for controlling the second drive assembly 504B and a second brake assembly 506B associated with the second zone 202B based on the first signal received from the first control module 302A. Control passes to operation 624 for performing the operation 622.

Turning to operation 624 in FIG. 6D, the accumulation conveyor 102 may include means, such as the second control module 302B associated with the second zone 202B, for identifying a type of instance in accordance with the information indicated by the first signal "S1". The first instance may be an instance when the information indicated by the first signal "S1" states that the entering article is the second instance of the first article "P2". Alternatively, the second instance may be an instance when the information indicated by the first signal "S1" states that the entering article is the second instance of the second article "C2". In an embodiment associated with the first instance, control passes to operation 626. In the alternate embodiment associated with the second instance, control passes to operation 632.

Turning to operation 626, the accumulation conveyor 102 may include means, such as the second control module 302B associated with the second zone 202B, for setting the second drive assembly 504B to an engaged state until the first sensor 110A is blocked by the second instance of the first article "P2".

In such case, as described above, the second control module 302B may transmit an "on" signal to the second drive assembly 504B, due to which the driving control valve connects the pneumatic pressure source to the second drive assembly 504B in the second zone 202B. This may cause the activated second drive assembly 504B to engage with the second conveyor rollers 402B. Specifically, the accumulator shoe assembly 210 is moved upwards and the upper run 208A of the drive belt 208 is engaged with the conveyor rollers 402B under the control of the second control module 302B until the first sensor 110A is blocked by the second instance of the first article "P2".

Figure 8B:
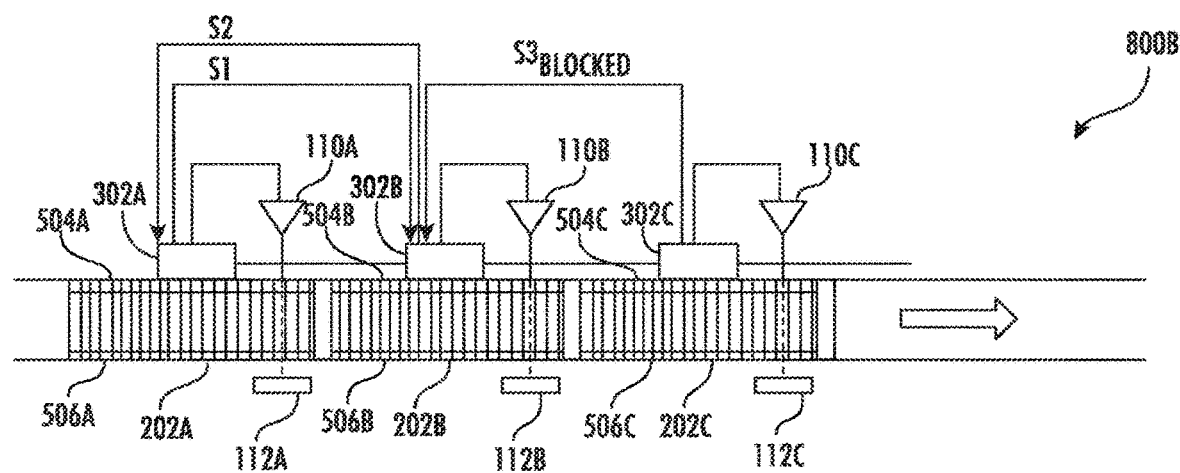
Figure 8B:
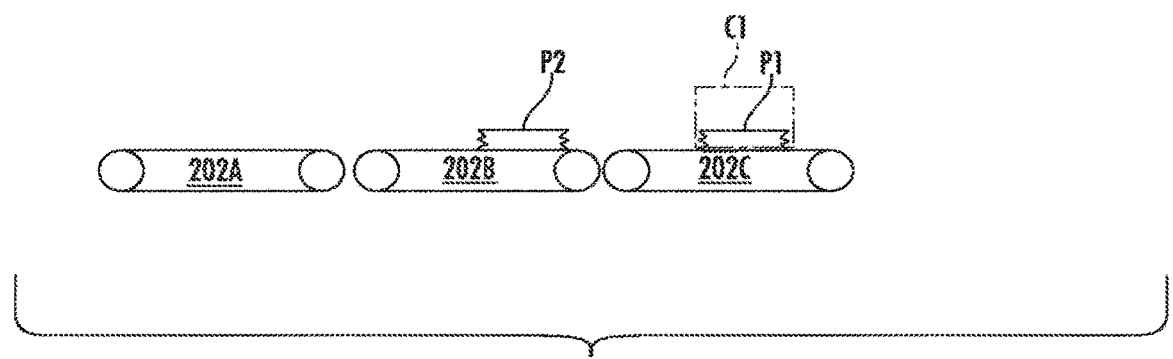

As illustrated in FIG. 8B, the second control module 302B may set the second drive assembly 504B to an engaged state to further convey the second instance of the first article "P2" in the second zone 202B. However, as soon as the second sensor 110B detects the boundary of the second instance of the first article "P2" and second sensor 110B is blocked by the second instance of the first article "P2", the second control module 302B may set the second drive assembly 504B to a disengaged state.

In such case, as described above, the second control module 302B may transmit an "off" signal to the second drive assembly 504B, due to which the driving control valve allows the pressurized air being delivered to the second drive assembly 504B to be vented in the second zone 202B. This may cause the activated second drive assembly 504B to disengage from the second conveyor rollers 402B. Specifically, upon deflation, the accumulator shoe assembly 210 is moved downwards and the upper run 208A of the drive belt 208 is disengaged from the conveyor rollers 402B under the control of the second control module 302B.

Turning to operation 628, the accumulation conveyor 102 may include means, such as the second control module 302B associated with the second zone 202B, for setting the second drive assembly 504B to the disengaged state and the second brake assembly 506B to an engaged state when the second instance of the first article "P2" blocks the second sensor 110B in an instance in which the first signal "S1" indicates that the second instance of the first article "P2" having the irregular boundary exits from the first zone 202A and enters the second zone 202B. Thus, based on the information indicated by the first signal "S1" stating that the entering article is the second instance of the first article "P2", the second control module 302B may control the second drive assembly 504B and the second brake assembly 506B associated with the second zone 202B.

In such a case, the second control module 302B may be configured to transmit an "on" signal to the second brake assembly 506B. Accordingly, the pneumatic pressure to the second brake assembly 506B in the second zone 202B is vented out, thereby causing the second brake assembly 506B to engage with the conveyor rollers 402B and stop the rotation of the conveyor rollers 402B. As a result, the second instance of the first article "P2" comes to rest in the second zone 202B with zero-contact accumulation.

As illustrated in FIG. 8B, the second control module 302B may set the second drive assembly 504B to the disengaged state and the second brake assembly 506B to an engaged state so that the second instance of the first article "P2" stops in the second zone 202B, thereby resulting in non-contact or zero-contact accumulation. By this way, the second instance of the first article "P2" blocks the second sensor 110B.

Turning to operation 630, the accumulation conveyor 102 may include means, such as the second control module 302B associated with the second zone 202B, for transmitting a second feedback signal "S2" to the first control module 302A in an instance in which the second instance of the first article "P2" blocks the second sensor 110B.

Figure 8C:
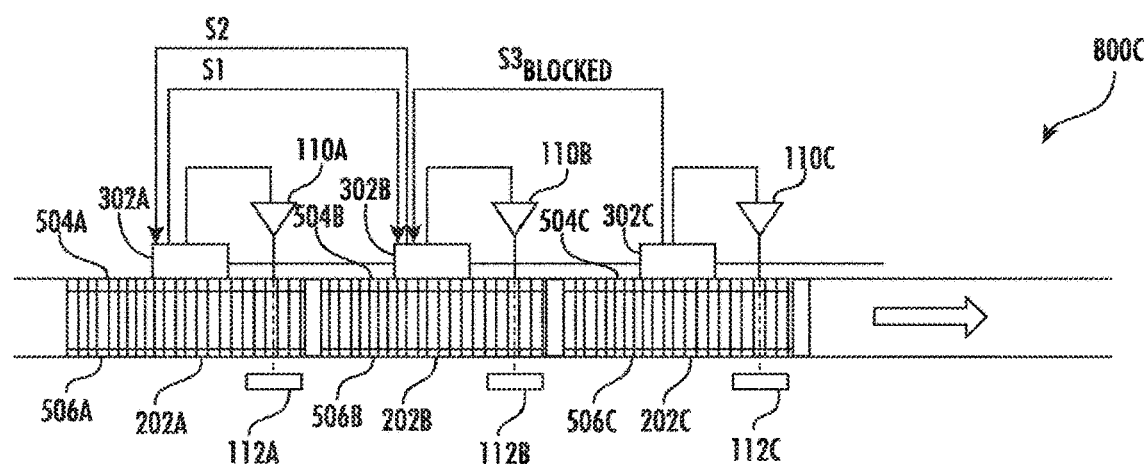
Figure 8C:
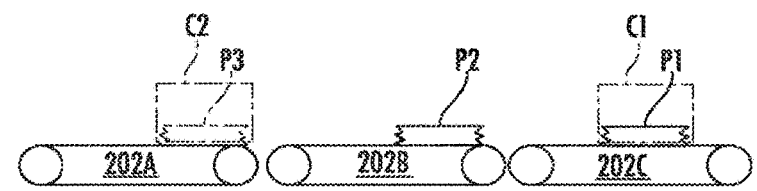

In accordance with an embodiment, as illustrated in FIG. 8C, once the second instance of the first article "P2" stops in the second zone 202B, thereby resulting in non-contact or zero-contact accumulation, the second control module 302B may be configured to transmit a second feedback signal "S2" back to the first control module 302A. In such case, the second feedback signal "S2" indicates to the first control module 202A to set the first brake assembly 506A to an engaged state and the first drive assembly 504A to a disengaged state, in the similar manner as described above, when the first sensor 110A is blocked by a third instance of the first article "P3" or the third instance of the second article "C3". The control terminates.

Turning to operation 632, the accumulation conveyor 102 may include means, such as the second control module 302B associated with the second zone 202B, for maintaining the second drive assembly 504B in the disengaged state in an instance in which the first signal "S1" indicates that the second instance of the second article "C2" having the regular boundary exits from the first zone 202A and enters the second zone 202B. Thus, based on the information indicated by the first signal "S1" stating that the entering article is the second instance of the second article "C2", the second control module 302B may control the second drive assembly 504B associated with the second zone 202B.

Figure 8D:
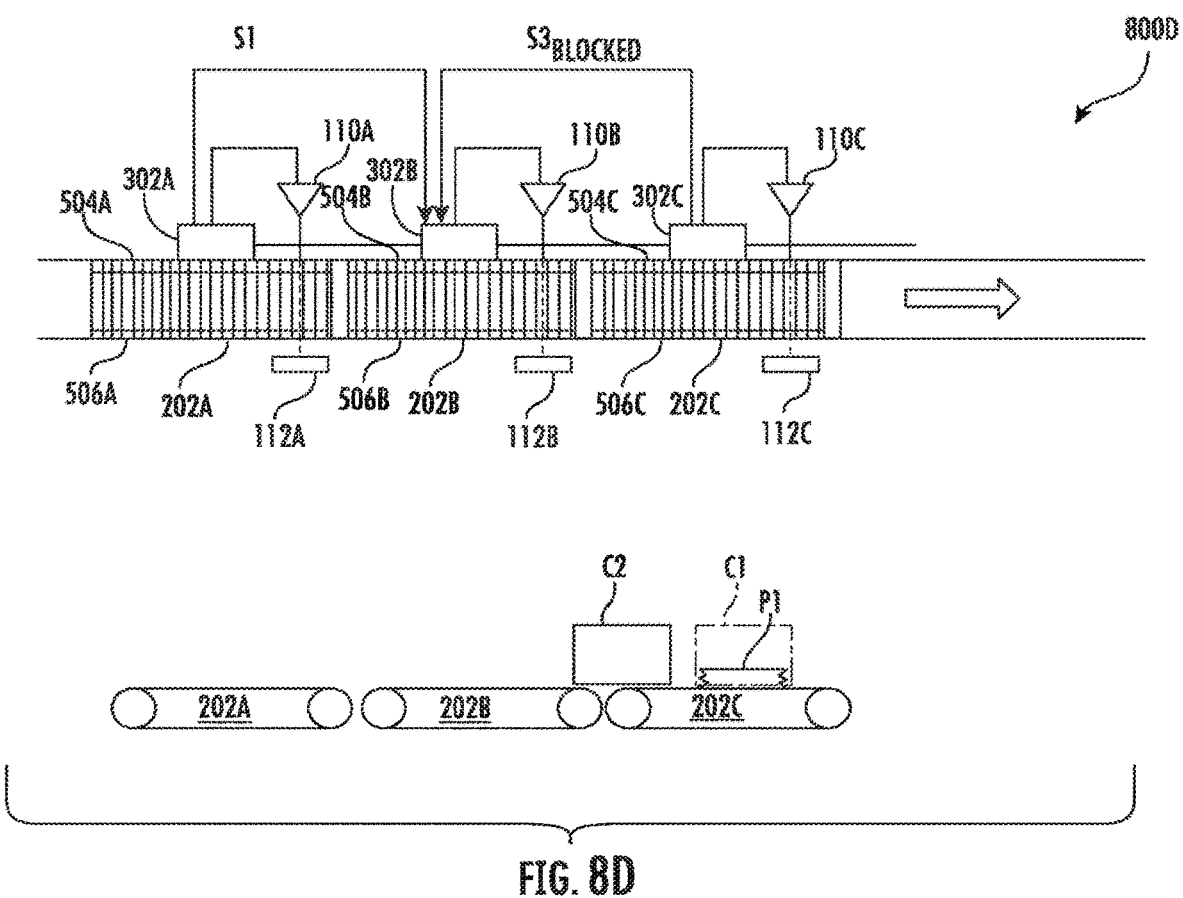

As illustrated in FIG. 8D, the second control module 302B may maintain the second drive assembly 504B in the disengaged state so that the second instance of the second article "C2" coasts to stop in the third zone 202C, thereby resulting in zero-pressure accumulation.

Figure 9:
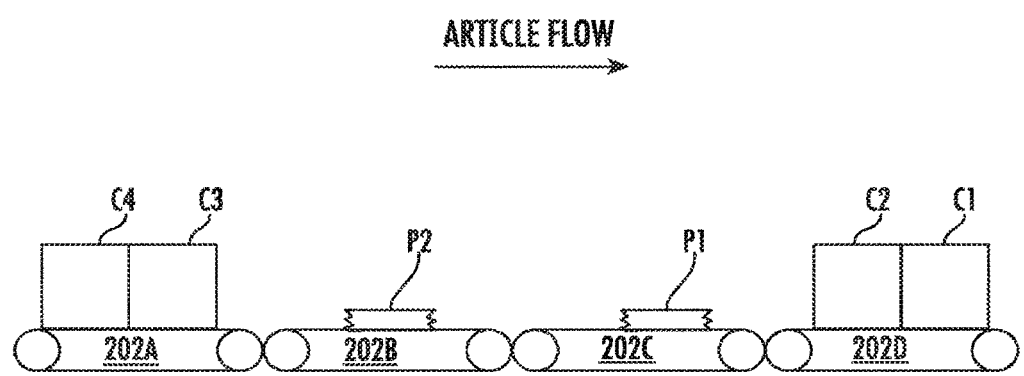
FIG. 9 illustrates a schematic view of an example scenario of objects accumulating on an accumulation conveyor 102, in accordance with various embodiments described herein.

FIG. 9 illustrates an example embodiment of an accumulation conveyor 102 having four zones 202 (e.g., 202A, 202B, 202C, 202D), with the fourth zone 202D downstream of the third zone 202C, the third zone 202C downstream of the second zone 202B, and the second zone 202B downstream of the first zone 202A. In the illustrated scenario, the first object accumulated on the accumulation conveyor is a second article "C1" accumulated on the fourth zone 202D. The second object accumulated on the accumulation conveyor is also a second article "C2" and thus is also accumulated in the fourth zone 202D with zero pressure accumulation with respect to C1. The third object accumulated on the accumulation conveyor is a first article "P1" which is accumulated on the third zone 202C with zero contact accumulation with respect to the immediately preceding and succeeding objects on the accumulation conveyor. The fourth object accumulated on the accumulation conveyor is another second article "P2" which is accumulated in the second zone 202B with zero contact accumulation with respect to the immediately preceding and succeeding objects on the accumulation conveyor. The fifth and sixth objects accumulated on the conveyor are both second articles "C3" and "C4" which are accumulated in the first zone 202A. C3 is accumulated with zero contact accumulation with respect to P2 and with zero pressure accumulation with respect to C4. As should be understood, a traditional accumulation conveyor accumulating first and second articles intermixed thereon would need to accumulate all zones with zero contact accumulation. Thus, a traditional accumulation conveyor would only be able to have accumulated four objects (e.g., C1, C2, P1, P2) in four zones, in the illustrated scenario. In contrast to a traditional accumulation conveyor, an accumulation conveyor of the present invention is able to accumulate six objects (e.g., C1, C2, P1, P2, C3, C4) in four zones, in the illustrated scenario.

Thus, in a nutshell, in instances when articles having irregular boundaries, such as polybags, are properly orientated and positioned to maintain suitable gaps therebetween, the accumulation system is operated in a manner resulting in zero-contact accumulation. Accordingly, barcodes disposed on such articles and/or other indicia printed and/or adhered to the article with irregular boundaries become and/or remain legible and can be properly scanned. This may lead to increase of overall efficiency of the accumulation conveyor 102. Further, in case articles having regular boundaries, such as cartons, are properly orientated and positioned to eliminate gaps therebetween, the accumulation system is operated in a manner resulting in zero pressure accumulation between the articles having regular boundaries, thereby maximizing overall throughput of the accumulation conveyor 102 within the single conveyor. As should be understood, in an example embodiment, articles having irregular boundaries and articles having regular boundaries may be conveyed concurrently by the accumulation system and the accumulation system is operated such that the articles having irregular boundaries experience zero-contact accumulation and, when two or more adjacent articles are articles having regular boundaries, the two or more adjacent articles having regular boundaries experience zero-pressure accumulation.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively or additionally, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A method for controlling a conveyor, the conveyor comprising a plurality of zones, the plurality of zones comprising at least a first zone and a second zone, wherein the first zone is upstream of the second zone, the method comprising:
   receiving, by a second control module associated with the second zone, a first signal from a first control module associated with the first zone, wherein the first signal indicates whether a first article that has an irregular boundary or a second article that has a regular boundary exits from the first zone; and
   controlling, by the second control module, a second drive assembly and a second brake assembly associated with the second zone based on the indication of the exit of the one of the first article or the second article from the first zone by the first signal received from the first control module, wherein the second drive assembly and the second brake assembly perform a first set of operations for the first article and a second set of operations for the second article.

2. The method according to claim 1, further comprising:
   detecting, by a first sensor associated with the first zone, a boundary type of an article conveyed by the conveyor in the first zone, wherein the article corresponds to the one of the first article having the irregular boundary or the second article having the regular boundary; and
   determining, by the first control module associated with the first zone, whether the first sensor is blocked by the first article or the second article in the first zone.

3. The method according to claim 2, further comprising:
   generating, by the first control module, the first signal based on the determination of whether the first zone is occupied by the first article or the second article; and
   transmitting, by the first control module, the first signal to the second control module associated with the second zone when the second drive assembly of the second zone is set to the disengaged state based on a third feedback signal received from a third control module associated with a third zone, wherein the second zone is upstream of the third zone.

4. The method according to claim 3, further comprising generating, by the third control module, the third feedback signal based on a signal received from the third sensor indicating that the third sensor is blocked in the third zone.

5. The method according to claim 1, wherein the controlling of the second drive assembly and the second brake assembly further comprises maintaining the second drive assembly in the disengaged state in an instance in which the first signal indicates that the second article having the regular boundary exits from the first zone and the second article enters the second zone.

6. The method according to claim 5, wherein the second article entering the second zone coasts to stop exhibiting zero pressure accumulation due to the disengaged state of the second drive assembly.

7. The method according to claim 1, wherein the controlling of the second drive assembly and the second brake assembly further comprises:
   setting the second drive assembly to an engaged state until a first sensor is blocked by the first article; and
   setting the second drive assembly to the disengaged state and the second brake assembly to an engaged state when the first article blocks a second sensor in an instance in which the first signal indicates that the first article having the irregular boundary exits from the first zone and the first article enters the second zone.

8. The method according to claim 7, wherein the first article entering the second zone stops exhibiting zero contact accumulation due to the disengaged state of the second drive assembly and the engaged state of the second brake assembly.

9. The method according to claim 7, further comprising transmitting, by the second control module, a second feedback signal to the first control module in an instance in which the first article blocks the second sensor,
   wherein the second feedback signal indicates to the first control module to set a first brake assembly to an engaged state and a first drive assembly to a disengaged state when the first sensor is blocked by one of another first or second article.

10. A material handling system, comprising:
   a conveyor comprising:
      a plurality of zones comprising at least a first zone and a second zone, wherein the first zone is upstream of the second zone;
      a plurality of sensors, comprising at least a first sensor and a second sensor,
         wherein the first sensor is located at an exit portion of the first zone, and the second sensor is located at an exit portion of the second zone; and
      a plurality of control modules comprising at least a first control module and a second control module, wherein the first control module is communicably coupled with the first sensor, the first zone, and the second control module, wherein the second control module is communicably coupled with the second sensor and the second zone,
         wherein the second control module is configured to:
            receive a first signal from the first control module associated with the first zone, wherein the first signal indicates whether a first article that has an irregular boundary or a second article that has a regular boundary exits from the first zone;

control a second drive assembly and a second brake assembly associated with the second zone based on the indication of the exit of the one of the first article or the second article from the first zone by the first signal received from the first control module, wherein the second drive assembly and the second brake assembly perform a first set of operations for the first article and a second set of operations for the second article; and a main controller communicably coupled with the conveyor to perform operations to receive data indicating conditions for each zone of the plurality of zones.

11. The material handling system according to claim 10, wherein the conditions comprise at least an operation of the conveyor in an upstream or downstream direction and a speed of each of the plurality of zones.

12. The material handling system according to claim 10, wherein the main controller is further configured to control movement of a plurality of articles on the conveyor.

13. The material handling system according to claim 10, wherein the main controller is further configured to monitor fault conditions associated with one or more of the plurality of zones, the plurality of sensors, and the plurality of control modules.

14. The material handling system according to claim 10, wherein the first sensor is configured to detect a boundary type of an article conveyed by the conveyor in the first zone, wherein the article corresponds to the one of the first article having the irregular boundary or the second article having the regular boundary.

15. The material handling system according to claim 10, wherein the first control module is configured to:
 determine whether the first sensor is blocked by the first article or the second article in the first zone;
 generate the first signal based on the determination that whether the first zone is occupied by the first article or the second article; and
 transmit the first signal to the second control module associated with the second zone when the second drive assembly of the second zone is set to the disengaged state based on a third feedback signal received from a third control module associated with a third zone, wherein the second zone is upstream of the third zone.

16. The material handling system according to claim 15, wherein the third control module is configured to generate the third feedback signal based on a signal received from a third sensor indicating that the third sensor is blocked in the third zone.

17. The material handling system according to claim 10, wherein the controlling of the second drive assembly and the second brake assembly further comprises maintaining the second drive assembly in the disengaged state in an instance in which the first signal indicates that the second article having the regular boundary exits from the first zone and the second article enters the second zone, wherein the second article entering the second zone coasts to stop exhibiting zero pressure accumulation due to the disengaged state of the second drive assembly.

18. The material handling system according to claim 10, wherein the controlling of the second drive assembly and the second brake assembly further comprises:
 setting the second drive assembly to an engaged state until the first sensor is blocked by the first article; and
 setting the second drive assembly to the disengaged state and the second brake assembly to an engaged state when the first article blocks the second sensor in an instance in which the first signal indicates that the first article having the irregular boundary exits from the first zone and the first article enters the second zone.

19. The material handling system according to claim 18, wherein the first article entering the second zone stops exhibiting zero contact accumulation due to the disengaged state of the second drive assembly and the engaged state of the second brake assembly.

20. The material handling system according to claim 18, wherein the second control module is further configured to transmit a second feedback signal to the first control module in an instance in which the first article blocks the second sensor, wherein the second feedback signal indicates to the first control module to set a first brake assembly to an engaged state and a first drive assembly to a disengaged state when the first sensor is blocked by one of another first or second article.

* * * * *